US009053612B2

(12) United States Patent

Kondo et al.

(10) Patent No.: US 9,053,612 B2

(45) Date of Patent: Jun. 9, 2015

(54) GAMING MACHINE

(71) Applicants: Universal Entertainment Corporation, Koto-ku, Tokyo (JP); Aruze Gaming America, Inc., Las Vegas, NV (US)

(72) Inventors: Yoshinori Kondo, Tokyo (JP); Jun Hirato, Tokyo (JP); Kenta Kitamura, Tokyo (JP); Takehisa Itagaki, Tokyo (JP)

(73) Assignees: Universal Entertainment Corporation, Tokyo (JP); Aruza Gaming America, Inc., Las Vegas, NV (US)

( * ) Notice: Subject to any disclaimer, the term of this patent is extended or adjusted under 35 U.S.C. 154(b) by 105 days.

(21) Appl. No.: 13/870,945

(22) Filed: Apr. 25, 2013

(65) Prior Publication Data

US 2013/0288774 A1 Oct. 31, 2013

(30) Foreign Application Priority Data

Apr. 27, 2012 (JP) ................................ 2012-104237

(51) Int. Cl.

*A63F 13/00* (2014.01)
*G07F 17/34* (2006.01)
*G07F 17/32* (2006.01)

(52) U.S. Cl.

CPC ............ *G07F 17/34* (2013.01); *G07F 17/3213* (2013.01)

(58) Field of Classification Search

CPC .. G07F 17/3211; G07F 17/3213; A63F 13/53
USPC ......................................... 463/16, 20, 30, 31
See application file for complete search history.

(56) References Cited

U.S. PATENT DOCUMENTS

| | | | | |
|---|---|---|---|---|
| 7,404,766 | B2 * | 7/2008 | Adachi et al. | 463/31 |
| 8,105,154 | B2 | 1/2012 | Okada | |
| 2003/0195035 | A1 * | 10/2003 | Onuki et al. | 463/20 |
| 2008/0125219 | A1 * | 5/2008 | Williams et al. | 463/31 |
| 2008/0214277 | A1 * | 9/2008 | Kishi | 463/20 |
| 2008/0227526 | A1 * | 9/2008 | Crossman et al. | 463/20 |

* cited by examiner

*Primary Examiner* — James S McClellan

(74) *Attorney, Agent, or Firm* — KMF Patent Services, PLLC; Kenneth M. Fagin, Esq.; S. Peter Konzel, Esq.

(57) ABSTRACT

A gaming machine of the present invention includes: a light application device configured to apply visible light representing visual information which enables recognition of information related to games on a reel band, The or each of one or more reels has a mirror layer which reflects the visible light from the light application device. The light application device is disposed in an area outside the window frame of the display window so that the visible light is applied to the reel, on the side of the reel band, and is used as a front light device that emits visible light which is not representing the visual information.

15 Claims, 35 Drawing Sheets

FIG.22
| SYMBOL CODE | FIRST ROW | SECOND ROW | THIRD ROW | FOURTH ROW | FIFTH ROW |
|---|---|---|---|---|---|
| 00 | BAR | BAR BAR | BAR | BAR BAR | BAR |
| 01 |  |  | 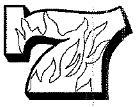 |  |  |
| 02 | BAR BAR BAR | BAR BAR BAR | BAR BAR BAR | BAR BAR BAR | BAR BAR BAR |
| 03 |  |  |  |  |  |
| 04 | BAR BAR | BAR | BAR BAR | BAR | BAR BAR |
| 05 | BAR BAR BAR | BAR BAR BAR |   | BAR BAR BAR | BAR BAR BAR |
| 06 | BAR BAR | BAR | BAR BAR | BAR | BAR BAR |
| 07 |  |  |  |  |  |
| 08 | BAR BAR | BAR | BAR BAR | BAR | BAR BAR |
| 09 | BAR | BAR BAR | BAR | BAR BAR | BAR |
| 10 |  |  | 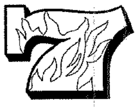 |  |  |

FIG.25
END CONDITION
CHANCE MODE
(COUNTER)
TRIGGER EVENT OCCURRED
·CHANCE CHERRY APPEARED
END CONDITION SATISFIED
·WINNING COMBINATION INCLUDING "7" OCCURRED
·CHERRY OCCURRED
·FINAL COUNT REACHED
NORMAL MODE
TRIGGER EVENT NOT OCCURRED

FIG.26

SYMBOL CODE DETERMINATION TABLE

| RANDOM NUMBER | SYMBOL CODE |
|---|---|
| 0-ULIMIT0 | 00 |
| LLIMIT01-ULIMIT01 | 01 |
| LLIMIT02-ULIMIT02 | 02 |
| LLIMIT03-ULIMIT03 | 03 |
| LLIMIT04-ULIMIT04 | 04 |
| LLIMIT05-ULIMIT05 | 05 |
| LLIMIT06-ULIMIT06 | 06 |
| LLIMIT07-ULIMIT07 | 07 |
| LLIMIT08-ULIMIT08 | 08 |
| LLIMIT09-ULIMIT09 | 09 |
| LLIMIT10-ULIMIT10 | 10 |

340
341
342
348

FIG.27

| RANDOM NUMBER | | | | | | | SYMBOL CODE |
|---|---|---|---|---|---|---|---|
| NORMAL GAME | NORMAL GAME | ··· | FIRST CHANCE GAME | SECOND CHANCE GAME | ··· | EIGHTH CHANCE GAME | |
| COL NO.1 | COL NO.2 | ··· | COL NO.1 | COL NO.2 | ··· | COL NO.8 | |
| 0-XXX | 0-XXX | ··· | 0-XXX | 0-XXX | ··· | 0-XXX | 00 |
| XXX-XXX | XXX-XXX | ··· | XXX-XXX | XXX-XXX | ··· | XXX-XXX | 01 |
| XXX-XXX | XXX-XXX | ··· | XXX-XXX | XXX-XXX | ··· | XXX-XXX | 02 |
| XXX-XXX | XXX-XXX | ··· | XXX-XXX | XXX-XXX | ··· | XXX-XXX | 03 |
| XXX-XXX | XXX-XXX | ··· | XXX-XXX | XXX-XXX | ··· | XXX-XXX | 04 |
| XXX-XXX | XXX-XXX | ··· | XXX-XXX | XXX-XXX | ··· | XXX-XXX | 05 |
| XXX-XXX | XXX-XXX | ··· | XXX-XXX | XXX-XXX | ··· | XXX-XXX | 06 |
| XXX-XXX | XXX-XXX | ··· | XXX-XXX | XXX-XXX | ··· | XXX-XXX | 07 |
| XXX-XXX | XXX-XXX | ··· | XXX-XXX | XXX-XXX | ··· | XXX-XXX | 08 |
| XXX-XXX | XXX-XXX | ··· | XXX-XXX | XXX-XXX | ··· | XXX-XXX | 09 |
| XXX-XXX | XXX-XXX | ··· | XXX-XXX | XXX-XXX | ··· | XXX-XXX | 10 |

FIG.28
SYMBOL APPEARANCE PROBABILITY TABLE
| SYMBOL | PROBABILITY |
|---|---|
|  | 1/XXX |
| 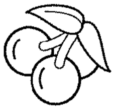 | 1/XXX |
| BAR BAR BAR | 1/XXX |
| BAR BAR | 1/XXX |
| BAR | 1/XXX |
|   | 1/XXX |
360
361
368

FIG.29

PAYOUT TABLE 360, 361, 368

| SYMBOL | PAYOUT | PROBABILITY |
|---|---|---|
| BAR BAR BAR BAR BAR<br>BAR BAR BAR BAR BAR<br>BAR BAR BAR BAR BAR | 120 | 1/152043 |
| BAR BAR BAR BAR<br>BAR BAR BAR BAR<br>BAR BAR BAR BAR | 60 | 1/21481 |
| BAR BAR BAR<br>BAR BAR BAR<br>BAR BAR BAR | 30 | 1/537 |
| BAR BAR BAR BAR BAR<br>BAR BAR BAR BAR BAR | 90 | 1/20041 |
| BAR BAR BAR BAR<br>BAR BAR BAR BAR | 45 | 1/4163 |
| BAR BAR BAR<br>BAR BAR BAR | 15 | 1/172 |
| BAR BAR BAR BAR BAR | 60 | 1/18415 |
| BAR BAR BAR BAR | 30 | 1/2185 |
| BAR BAR BAR | 12 | 1/101 |
| ANY BAR ANY BAR ANY BAR ANY BAR ANY BAR | 15 | 1/146 |
| ANY BAR ANY BAR ANY BAR ANY BAR | 6 | 1/96 |
| ANY BAR ANY BAR ANY BAR | 3 | 1/8 |
|  | 60 | 1/1560046480 |
|  | 30 | 1/4369884 |
|  | 15 | 1/31144 |
|  | 6 | 1/454 |
|  | 3 | 1/14 |
|  | 1000 | 1/10415 |
|  | 300 | 1/1037 |
|  | 200 | 1/494 |

FIG.30

PROBABILITY OF WINNING BY COMBINATION OF "CHERRY" AND "7"

| SEQUENCE OF CHANCE MODE GAME | PROBABILITY OF "CHERRY" | PROBABILITY OF "7" | PROBABILITY OF CONTINUATION |
|---|---|---|---|
| FIRST GAME | · | 1/67.2 | 1/672.0 |
| SECOND GAME | 1/10.4 | 1/59.7 | 1/597.3 |
| THIRD GAME | 1/6.6 | 1/44.8 | 1/448.0 |
| FOURTH GAME | 1/4.9 | 1/41.8 | 1/418.1 |
| FIFTH GAME | 1/3.8 | 1/39.2 | 1/392.0 |
| SIXTH GAME | 1/3.7 | 1/29.4 | 1/294.0 |
| SEVENTH GAME | 1/2.6 | 1/23.2 | 1/232.3 |
| EIGHTH GAME | 1/1.5 | 1/9.5 | 1/94.5 |

PROBABILITY RISES WITH PROGRESS OF CHANCE MODE GAME

PROBABILITY OF COMBINATION WITH "7" IN CHANCE MODE GAME

| SEQUENCE OF CHANCE MODE GAME | 777 | 7777 | 77777 |
|---|---|---|---|
| FIRST GAME | 1/32.8 | 1/67.2 | 1/672.0 |
| SECOND GAME | 1/29.1 | 1/59.7 | 1/597.3 |
| THIRD GAME | 1/21.9 | 1/44.8 | 1/448.0 |
| FOURTH GAME | 1/20.4 | 1/41.8 | 1/418.1 |
| FIFTH GAME | 1/19.1 | 1/39.2 | 1/392.0 |
| SIXTH GAME | 1/14.3 | 1/29.4 | 1/294.0 |
| SEVENTH GAME | 1/11.3 | 1/23.2 | 1/232.3 |
| EIGHTH GAME | 1/4.6 | 1/9.5 | 1/94.5 |

GAMING MACHINE

CROSS-REFERENCE TO RELATED APPLICATION

The present application claims priority from Japanese Patent Application No. 2012-104237, which was filed on Apr. 27, 2012, the disclosure of which is herein incorporated by reference in its entirety.

BACKGROUND OF THE INVENTION

The present invention relates to a gaming machine configured to run a slot game which determines win/loss based on a symbol combination.

In traditional gaming machines adopting mechanical reels, reels having symbols on its outer circumference and a reel driving mechanism for rotating the reels are arranged inside a cabinet; a transparent liquid crystal panel is arranged on the side of the front surface of the reels; and the reel surfaces are made visible through the transparent liquid crystal panel, so that the symbols on the reels and the visual information on the transparent liquid crystal panel are displayed at the same time, as is disclosed in for example U.S. Pat. No. 8,105,154.

There have traditionally been needs for simultaneous displaying of the symbols on the reels and visual information. Additionally to simultaneous displaying of the symbols and the visual information, there are needs for simple structure to cut down the costs, and for clear displaying of the symbols which directly relates to the slot game.

SUMMARY OF THE INVENTION

It is an object of the present invention to provide a gaming machine which enables simultaneous displaying of the symbols and the visual information while clearly displaying the symbols, with a simple structure.

An aspect of the present invention is a gaming machine including: a cabinet having a display window; one or more reels disposed in the cabinet so that the or each reel is visible from outside the cabinet through the display window, the or each of the one or more reels being provided with a reel band having symbols; and a light application device configured to apply visible light representing (containing) visual information which enables recognition of information related to games on an outer circumference of the one or more reels, wherein the or each of the one or more reels has a mirror layer which reflects the visible light from the light application device, and the light application device is disposed in an area outside a window frame of the display window so that the visible light is applied to the reels, on a side of the reel band, and is used as a front light device configured to emit visible light not representing the visual information.

With the structure having the light application device disposed outside the window frame of display window, the visual information is displayed on a the display window side of the reels, without a need of setting a visual information display device such as a transparent liquid crystal panel or a half mirror between the display window and the reels. Therefore, it is possible to see the symbols directly thorough the display window. This improves the visibility of the symbols when the symbols are displayed through the display window. That is, it is possible to simultaneously display the symbols and the visual information, while clearly displaying the symbols, with a simple structure. Further, the light application device is also used as the front light device, which contributes to cutting down of the costs by reducing the number of parts.

The gaming machine of the present invention may be adapted so that the light application device includes: a transparent member colored so as to form the visual information of a predetermined color by passing the visible light; and a light source configured to emit, in a switchable manner, visible light of a complementary color to the color of the transparent member and visible light of a color other than the complementary color.

With the structure, it is possible to display the visual information on the reel band (on-state) or hide the visual information (off-state) by switching between the visible light of a complementary color and the visible light of a color other than the complementary color.

The gaming machine of the present invention may further include: a reel device configured to support the reels so as to enable the reels to rotate independently of another; and an illumination light control device configured to control the light application device so that the visible light of the complementary color and the visible light of a color other than the complementary color are switched from one to the other only when rotation of all the reels is stopped.

With the structure, the visual information is displayed or hidden while at least one of the reels is rotating, and switching over between displaying and hiding of the visual information is executed only when all the reels are stopped.

EFFECTS OF THE INVENTION

The aspects of the present invention allow clear displaying of the symbols, while displaying the symbols and visual information at the same time, by using a simple structure.

BRIEF DESCRIPTION OF THE DRAWINGS

FIG. 21 A is a block diagram showing a process of a main game program run by a motherboard such as that shown in the electric block diagram of FIG. 21.

FIG. 22 is a diagram showing an exemplary symbol code table designating the symbols on the outer circumference surface of the reels.

FIG. 26 is a diagram showing exemplary data fields of a symbol code determination table.

FIG. 27 is a diagram showing a field structure of a symbol code determination table in which a plurality of tables are integrated into a single table.

FIG. 28 is a diagram showing an exemplary symbol determination table.

FIG. 29 is a diagram showing an exemplary payout table.

FIG. 30 is a diagram showing probabilities of winning combinations associated with specific symbols, and is a table showing probabilities that are increased as the chance mode game continues.

DESCRIPTION OF THE PREFERRED EMBODIMENTS (Overview of Gaming Machine)

Figure 1:
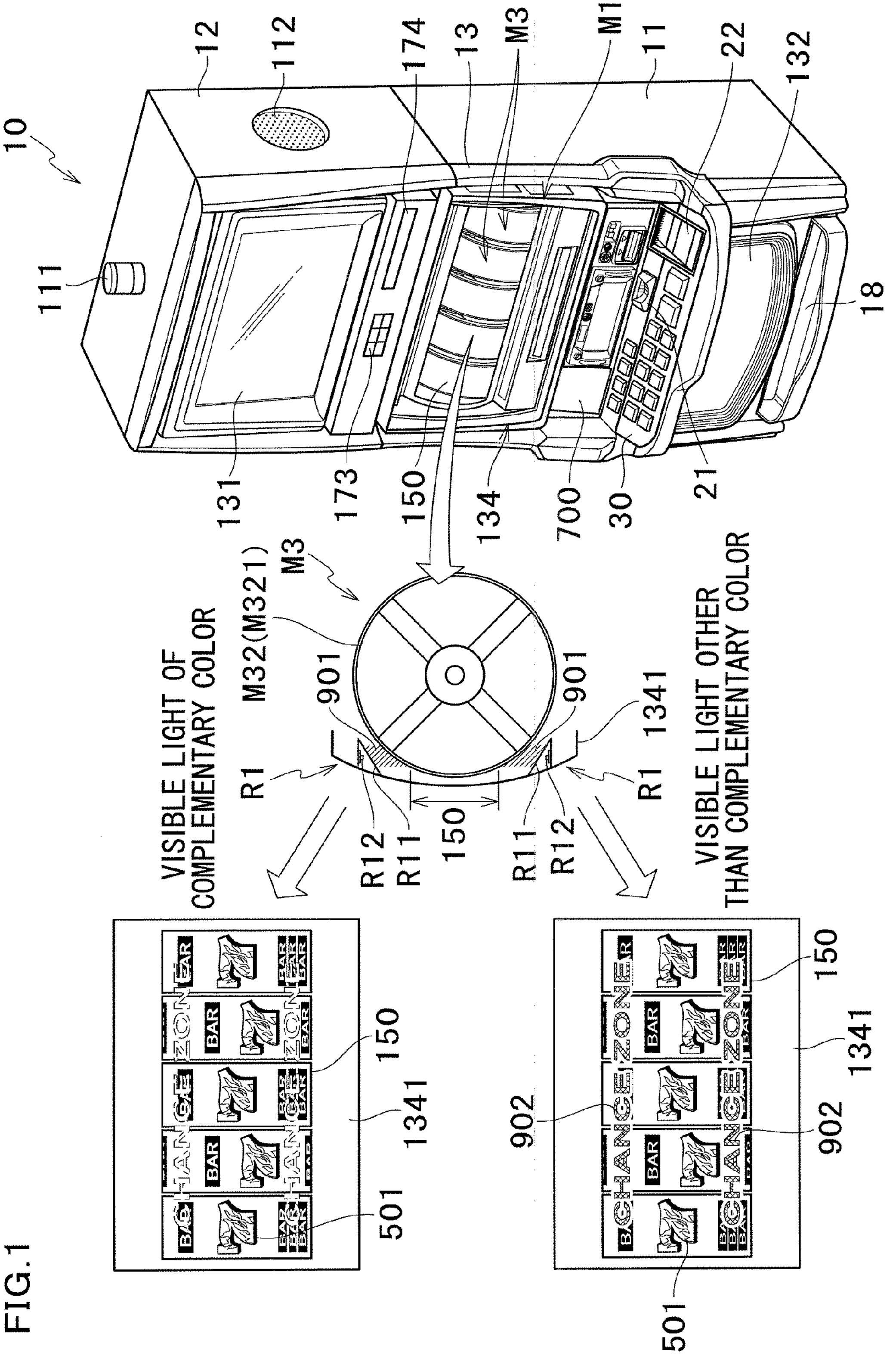
FIG. 1 is an explanatory diagram showing an operation of the gaming machine.

As shown in FIG. 1, in the gaming machine of the present embodiment, visible light 901 is applied to a reel band M32 having a half mirror layer M321, and the visible light 901 is partly reflected on the half mirror layer M321, thus making the visual information in the form of visible light 901 having reflected on the reel band M32 visible along with the symbol 501 on the reel band M32. Note that the following description assumes that the gaming machine is a type including a plurality of slot machines 10, which enables participation of multiple players; however, the present invention is applicable to a single slot machine 10 intended for a single player.

Figure 15:
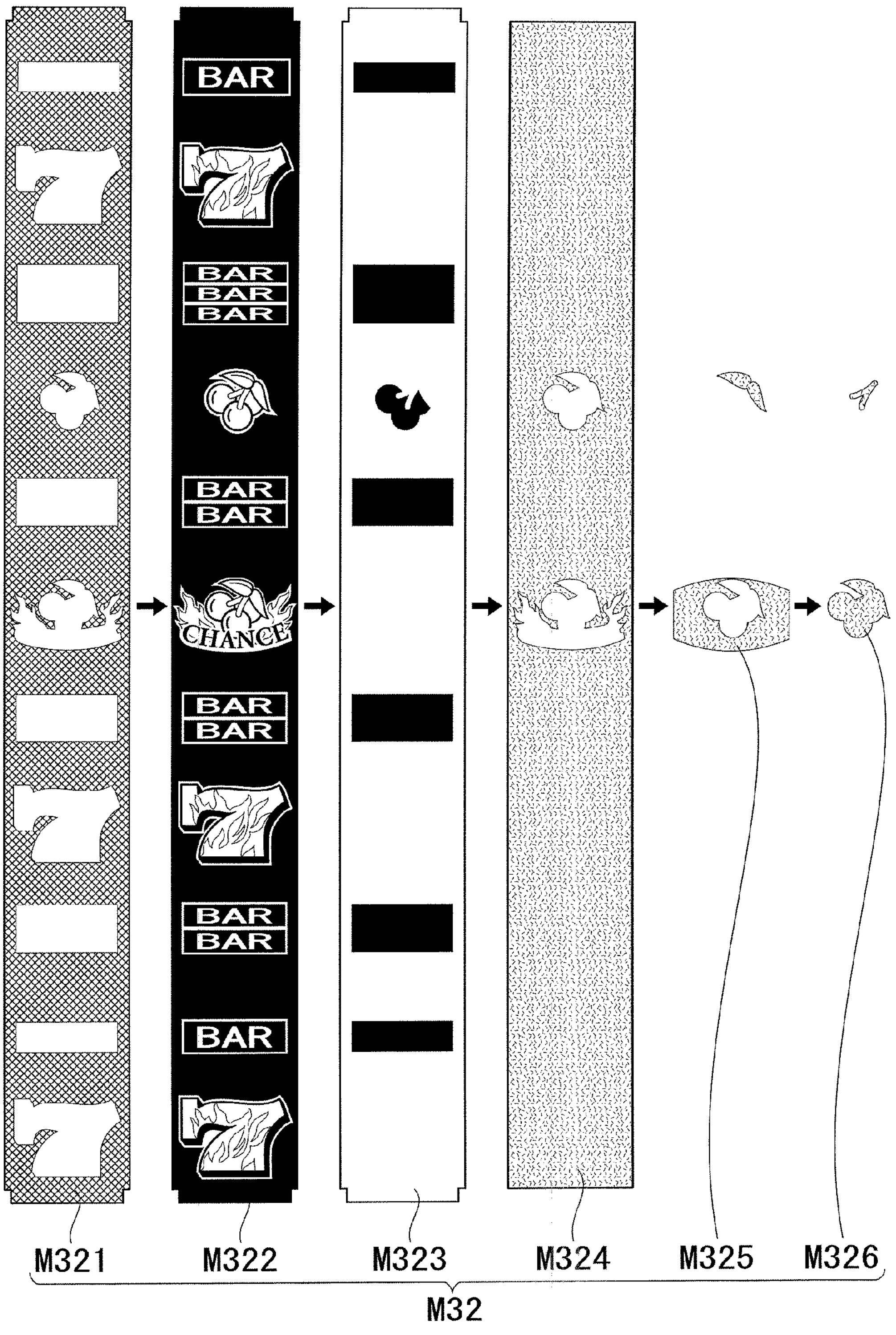
FIG. 15 is an explanatory diagram showing layers of a reel band.

Specifically, the slot machine 10 serving as the gaming machine includes: reels M3 each having on its entire circumference a reel band M32 having a plurality of symbols 501; and a light application device R1 arranged on the outer circumference side of the reel M3, which applies visible light 901 representing (containing) visibly recognizable visual information 902 to the reel M31. The reel band M32 has a half mirror layer M321 as shown in FIG. 15, which partially reflects the visible light 901 from the light application device R1. The "visual information 902" here may be a symbol having a shape identical to the symbol 501 on the reel band M32, a string of text, or a number.

Since the reel band M32 has the half mirror layer M321 in the above structure, the visible light 901 emitted from the light application device R1 is partially reflected on the reel band M32. Therefore, along with the symbols 501 on the reel band M32, it is possible to visually confirm the visual information 902 displayed by the visible light 901 having reflected on the reel band M32. Such a structure is simple as compared with a case where a transparent liquid crystal panel or a half mirror is used to display visual information 902 along with the symbols, and there is no need of arranging an obstacle such as a transparent liquid crystal panel on the line of sight to the symbols 501 on the reel band M32. It is therefore possible to clearly display symbols 501; i.e., to improve the visibility.

Note that the slot machine 10 serving as the gaming machine is not particularly limited as long as it includes: the reels M3 each having the reel band M32 having the symbols 501; and the light application device R1 configured to apply visible light 901 representing visual information 902 which is visibly recognizable information related to the game to the outer circumference of the reel band M32, and as long as the reel band M32 has a mirror layer for reflecting the visible light 901 from the light application device R1.

In other words, the number of the symbols 501 may be any given number of one or more. Further, the symbol 501 may be formed throughout the entire circumference of the reel M3, or may be formed a part of the entire circumference. Further, the reel band M32 may have a mirror layer with a reflectance of 100%, in place of the half mirror layer. In case of adopting the reel band M32 having the mirror layer, a symbol layer having the symbols 501 is arranged on the outer position of the reel M3 than the mirror layer. This way, the illumination light of the hall on the cabinet 11 side reflects on the mirror layer, thus displaying the symbols 501 of the symbol layer.

Further, the slot machine 10 is also used as a front light device that emits visible light 901 which is not for displaying the visual information 902. This way, the light application device R1 is also used as the front light device, which contributes to cutting down of the costs by reducing the number of parts.

Figure 2:
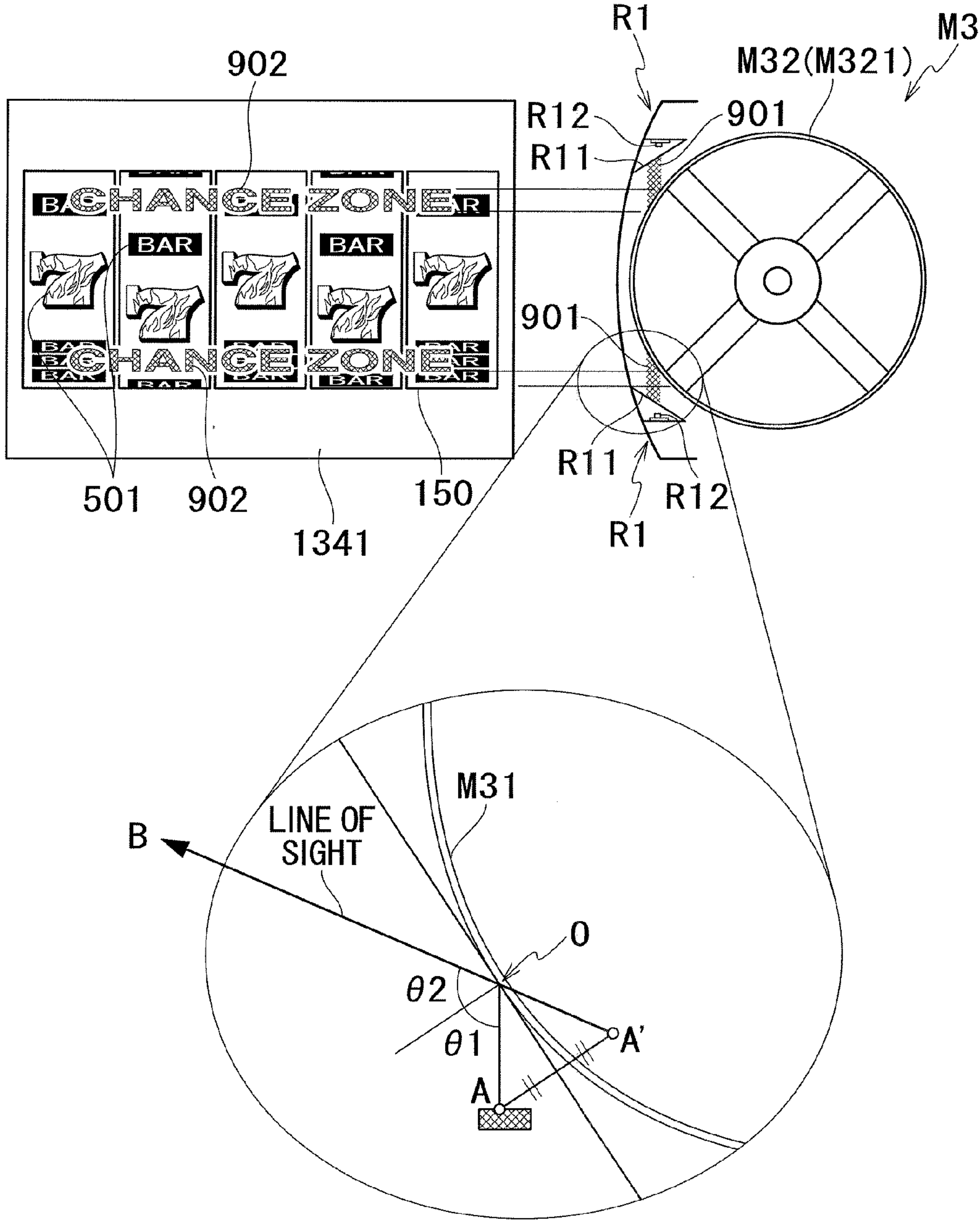
FIG. 2 is an explanatory diagram showing display of a backward side of the visual information.

More specifically, the slot machine 10 serving as the gaming machine has a cabinet 11 (cabinet) having a display window 150. The reel M3 is arrange inside the cabinet 11 in such a manner that the reel M3 is visible from outside the cabinet 11 through the display window 150. Further, in the cabinet 11, the light application device R1 is disposed in an area outside the window frame of the display window 150 so that the visible light 901 is applied to the reel M3, on the side of the reel band M32. That is, the light application device R1 is set so as to apply visible light 901 to the reel band M32 which is positioned in a portion of the reel M3 facing the display window 150. In other words, as shown in FIG. 2, the light application device R1 is disposed in a position out of a sight area in which the reels M3 are visible from outside the cabinet 11 through the display window 150. Note that the light application device R1 may be arranged outside the cabinet 11.

Thus, when the visual information 902 is displayed in a symbol position of the symbol 501 on the reels M3 viewed from outside the cabinet 11 through the display window 150, this visual information 902 is a reflection of the visible light 901 from the light application device R1 disposed in a position out of the line of sight. Therefore, it appears as if the visual information 902 is arranged in a position on the inner circumference side of the reels by a distance corresponding to the distance from the symbol positions on the reels to the position where the light application device R1 is arranged. As the result, the symbol 501 appears on the reel band M32 and the visual information 902 appears on the backward side of the reel band M32, i.e., the inner circumference side of the reels M3. How the visual information 902 appears on the backward side of the reel band M32, i.e., on the inner circumference side of the reel M3, is detailed later.

Figure 3:
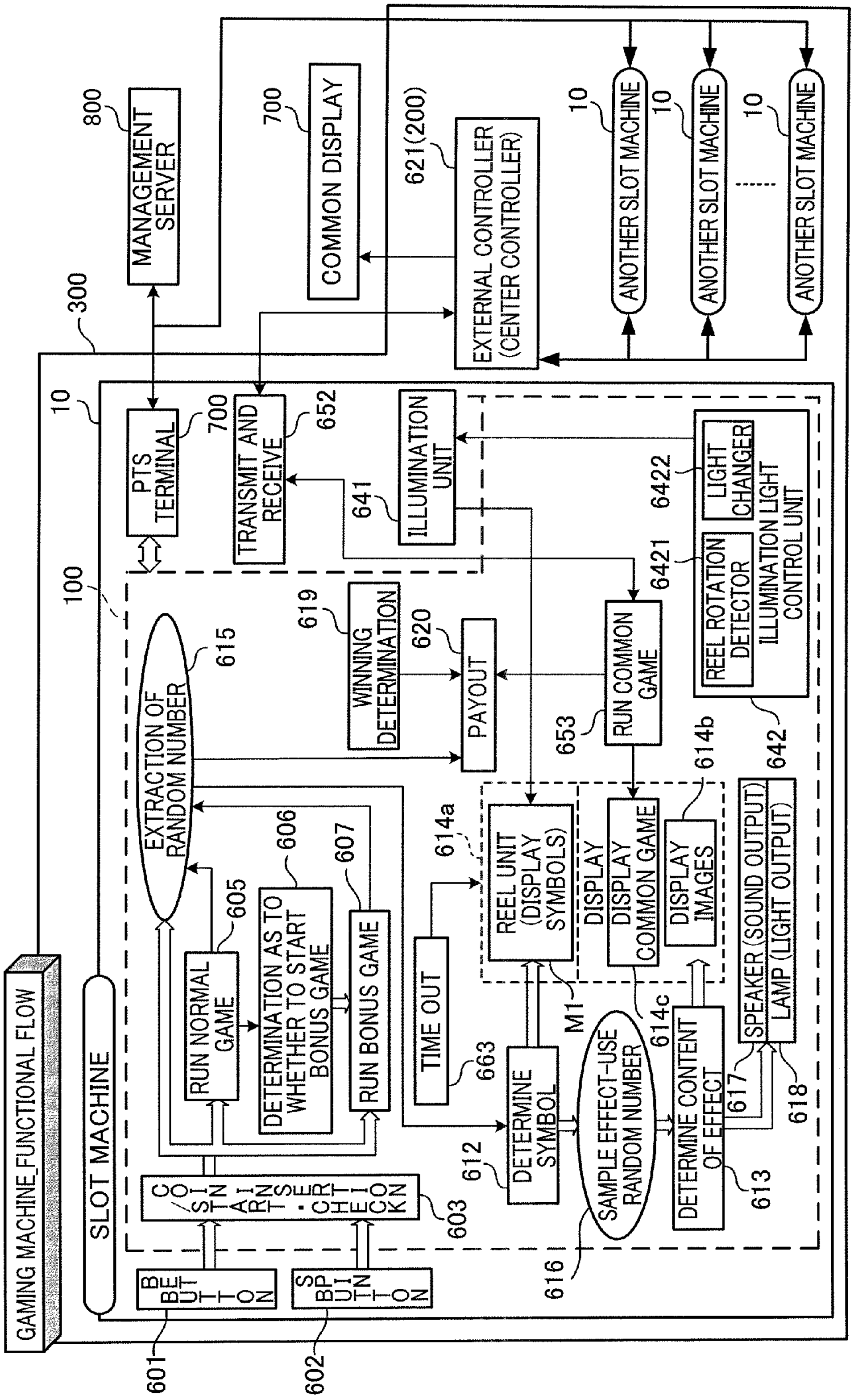
FIG. 3 is an explanatory diagram showing a function flow of the gaming machine.
Figure 4:
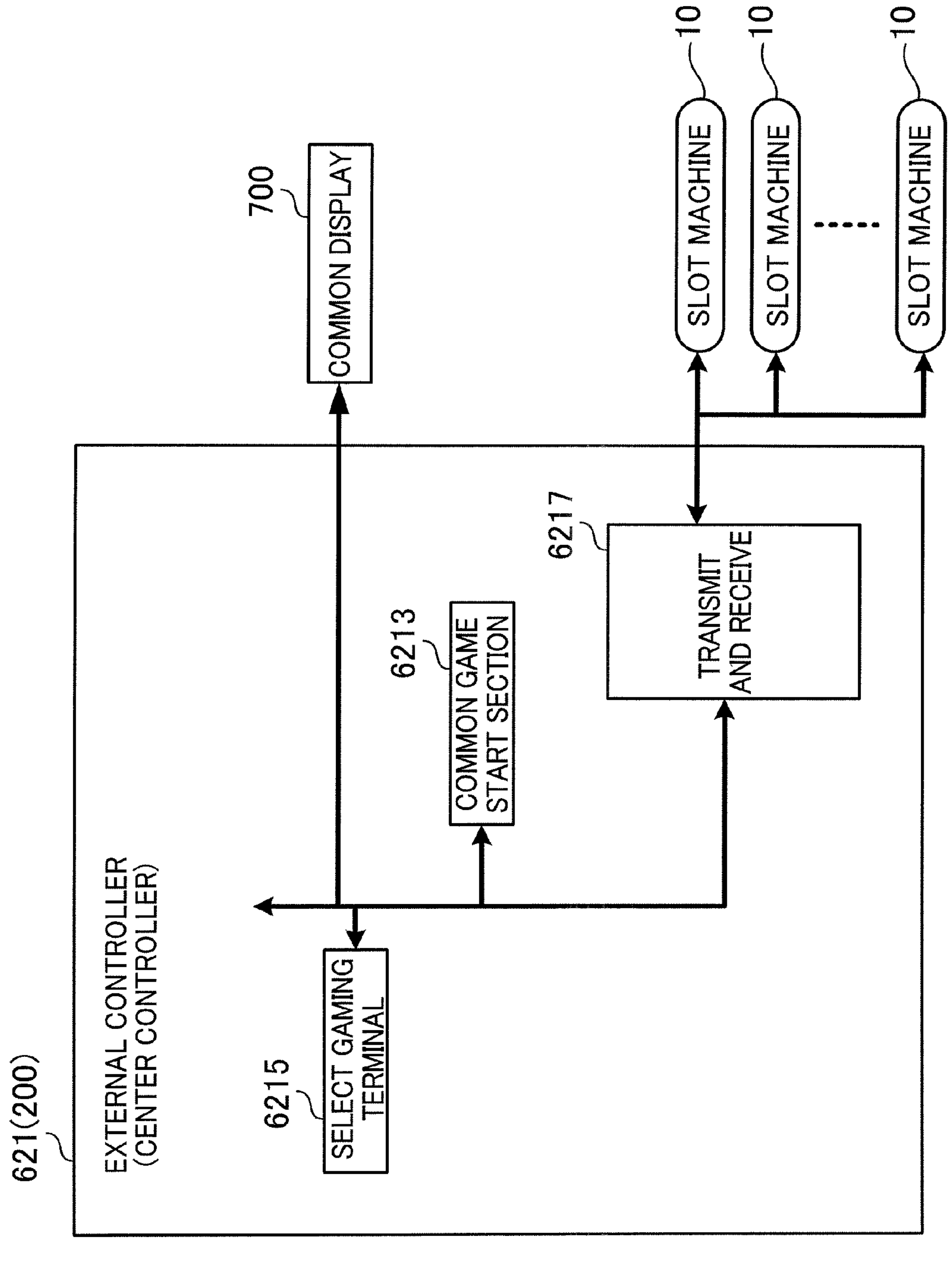
FIG. 4 is an explanatory diagram showing a function flow of an external controller.

The slot machine 10 with the above described structure is provided to a multiple-player type gaming machine 300, as shown in FIG. 3. The gaming machine 300 includes a plurality of slot machines 10 each serving as the gaming terminal having the reel device M1, which are connected to the center controller 200 in such a manner that data communication is possible. The gaming machine 300 enables running of a basic game such as a slot game independently in each of the slot machines 10, and enables running of a common game by synchronizing the slot machines 10 with each other.

Note that the connection between the slot machine 10 and the center controller 200 may be wired or wireless, or may be a combination of these. The unit of the bet amount may be a national or local currency such as Dollar, Yen, Euro, or a game point used only in the field or halls having the gaming machine 300.

More specifically, the gaming machine 300 has: an input device configured to enable an input from outside; a plurality of slot machines 10 each configured to run a basic game independently of another and having a terminal controller programmed to run various processes for conducting a common game which is run in the slot machines 10; and a center controller 200 connected to and in communication with the slot machines 10 and programmed to run various processes.

The terminal controller of the gaming machine 300 is configured to execute at least: a process of running a basic game upon an input of a start operation through the input device; a process of running a common game upon reception of a game start command from the center controller 200; and a process of determining a game result of the common game, based on game result information from the center controller 200.

Further, as shown in FIG. 2, the terminal controller is configured to further execute a process of applying the visible light 901 to the half mirror layer M321 during the basic game, so as to cause the visible light 901 to partially reflect on the half mirror layer M321, to display to the player the visual information 902 by using the visible light 901 at the backward side of the half mirror layer M321. Note that the half mirror layer M321 may be formed on parts other than the reel band M32. For example, the mirror layer M321 may be provided to the display device for running therein the common game. In this case, the visual information 902 is made visible at the backward side of the display screen for running thereon the common game.

Here, the "common game" here is a sub game which is different from a basic game (main game) which is an essential game of the gaming machine 300. The common game is run in parallel to the basic game or during a period in which the basic game is stopped. For example, the common game may be craps game, baseball game, and soccer game.

As shown in FIG. 3, the center controller 200 of the gaming machine 300 is configured to execute at least: a process of outputting a game start command to a slot machine 10 satisfying a game running condition at a predetermined timing; a process of determining a game result of the common game; a process of outputting the game result determined as the game result information to the slot machine 10.

Here, the "game running condition" is a condition for enabling participation into the common game. For example, the condition may be an accumulated value of the bet amount on the basic game being the minimum bet amount or more, or the number of games in the basic game being a minimum number of times or more. Note that the "game running condition" can be satisfied by the player based on his/her will, immediately before the common game is started. For example, if the game running condition is not satisfied due to the accumulated value of the bet amount of the basic game falling short of the minimum bet amount, the player may satisfy the game running condition by paying a difference between the minimum bet amount and the accumulated value of the bet amount before the common game is started, or by paying an amount to meet the predetermined condition. Further, if the condition is not satisfied due to the number of basic games played falling short, the player may satisfy the game running condition by paying an amount to compensate the shortage, or by paying an amount to meet the predetermined condition.

Further, the predetermined timing for outputting the game start command is a timing at which the common game start condition is satisfied in any one of the slot machine 10. The "common game start condition" relates to the accumulated bet amount information or an accumulated number of basic games. The present embodiment deals with a case where the gaming machine 300 having the center controller 200 apart from the slot machine 10; however, the present invention is not limited to this. The gaming machine 300 may be arranged such that one or more slot machine 10 has the function of the center controller 200 and the slot machines 10 are connected to be able to communicate with one another.

The slot machine 10 above is a kind of the gaming terminals in the gaming machine 300. Although the present embodiment deals with the slot machine 10 as an example of the gaming terminal, the disclosure is not limited to this and any type of device having a terminal controller that is able to independently run a basic game may be used as the gaming terminal.

The basic game in the present embodiment is run by the slot machine 10. The basic game is a slot game of rearranging a plurality of symbols 501. The basic game is not limited to the slot game but is any type of games capable of being independently run at a gaming terminal such as the slot machine 10.

Rearrangement of symbols 501 in the slot game is executed by the reel device M1 (symbol display device). The slot game includes a process of running a normal game of rearranging symbols 501 on the reel device M1 on condition that a gaming value is bet and awarding a normal payout based on the rearranged symbols 501, a process of running a bonus game of rearranging symbols 501 with the assumption that the payout rate is higher than that of the normal game when the rearranged symbols 501 achieve a predetermined condition and awarding a bonus payout based on the rearranged symbols 501, and a process of executing a rescue process when a rescue start condition is established.

The number and types of the "symbols 501" are not limited provided that the symbols 501 are rearranged in the reel device M1. The symbols 501 are superordinate concept of the specific symbols and normal symbols. The specific symbols are added to the normal symbols as needed. For example, the specific symbols include wild symbols and trigger symbols. The wild symbol can be used as a substitute for any type of the symbol 501. Each trigger symbol is a symbol that serves at least as a trigger for start running the bonus game. For example, in the present embodiment, the trigger symbol is "Chance Cherry". The trigger symbol may function as a trigger of increase in the number of the specific symbols in the bonus game, i.e., increase in the number of the specific symbols of at least one of the trigger symbol and the wild symbol. Furthermore, the trigger symbol may function as a trigger of increase in the number of times to run the bonus game.

A coin, a bill, or electrically valuable information corresponding to these is used as a gaming value. It is to be noted that the gaming value in the disclosure is not limited to these, and for example a medal, token, electric money or the like can be adopted. Further, a later-described ticket with a barcode is also used.

The bonus game is equivalent to a feature game. While the bonus game in the present embodiment is described as games repeating a free game, the bonus game is not limited to them but is any type of game as long as the gaming state is more advantageous than that of the normal game. Other types of the bonus game may be employed as long as the gaming state is advantageous for the player, i.e., the gaming state is more advantageous than that of the normal game. For example, in the bonus game, various states such as a state in which more gaming values can be achieved as compared to the normal game, a state in which the probability of obtaining a gaming value is higher than the probability in the normal game, and a state in which the number of consumed gaming values is smaller than in the normal game are achieved independently or in combination.

A free game is a game which is executable with a smaller amount of gaming values bet than in the normal game. The expression "executable with a smaller amount of gaming value bet" includes a case where an amount of gaming values bet is zero. Therefore, the free game may be a game which is run without betting a gaming value and the gaming value is paid out for an amount corresponding to rearranged symbols 501. In other words, the free game may be a game that starts even if no gaming value is consumed. On the other hand, the normal game is run on condition that a gaming value is bet, and is a game of paying out gaming value for an amount corresponding to rearranged symbols 501. In other words, the normal game is a game that starts with the consumption of the gaming value.

The term "rearrangement" means rotate displaying the symbols 501 and then stop displaying them. In other words, the term indicates that the symbols 501 are rearranged after the arrangement of the symbols 501 is dismissed. The term "arrangement" indicates a state in which the symbols 501 are visually recognizable by an external player.

The phrase "normal payout based on the rearranged symbols 501" indicates a normal payout corresponding to a winning combination resulting from the rearrangement. The phrase "bonus payout based on the rearranged symbols 501" indicates a bonus payout corresponding to a winning combination resulting from the rearrangement. It is noted that the term "winning combination" indicates that a prize is established.

Examples of "a condition in which the payout rate is higher than in the normal game" include the execution of a free game, increase in the number of the wild symbol and the trigger symbol, and the execution of a game using a symbol table. The rescue process may be executed when the rescue start condition is satisfied in the basic game.

The rescue process is a process to relieve players. Examples of the rescue process include the execution of a free game, the increase in the number of the wild symbol and the trigger symbol, the execution of a game using a substituted symbol table, and the awarding of an insurance payout.

Examples of "rescue start condition" includes a case where the normal game is excessively repeated, i.e., the normal game is repeated for a predetermined number or more of times and a case where the total amount of obtained payout is excessively small, i.e., the obtained normal payout and bonus payout is smaller than a predetermined amount after a single player repeats the game for a predetermined number or more of times. The rescue process is a process to relieve players. Examples of the rescue process include the execution of a free game, the increase in the number of the wild symbol and the trigger symbol, the execution of a game using a substituted symbol table, and the awarding of an insurance payout.

In addition to the above, the gaming machine 300 may include a common display device 700 which is provided to be viewable from operation positions of all slot machines 10, and the center controller 200 may display a state until the establishment of a common game start condition on the common display device 700. It is noted that the operation position is the eye level position of the player operating each slot machine 10. With the gaming machine 300 having the feature above, it is possible to allow each player to estimate the waiting time until the common game starts, as the state until the establishment of the common game start condition is displayed on the common display device 700.

(Function Flow of Gaming Machine 300: Slot Machine)

The gaming machine 300 arranged as above includes slot machines 10 and an external controller 621 (center controller 200) connected to the slot machines 10 to be able to communicate therewith. The external controller 621 is able to communicate with the slot machines 10 provided in a hall.

Each slot machine 10 includes a BET button 601, a spin button 602, and a display 614, and further includes a game controller configured to control these units. The BET button 601 and the spin button 602 are kinds of input devices. The slot machine 10 further includes a transceiver unit 652 that makes it possible to perform data communication with the external controller 621.

The BET button 601 above has a function of receiving a bet amount input by the player. The spin button 602 has a function of receiving an instruction to start a game such as a normal game in response to an operation by the player, i.e., a start operation. The display 614 has a function of displaying still image information such as various symbols 501, numbers, and characters and moving image information such as effect movies. The display 614 has a symbol display region 614*a*, an image display region 614*b*, and a common game display region 614*c*.

The symbol display area 614*a* has a reel device M1 and displays the symbols 501 shown in FIG. 1. The image display region 614*b* displays various types of effect image information executed during a game, by means of moving images and still images. The common game display area 614*c* is an area which displays a common game such as a jackpot game.

The game controller 100 includes a coin insertion/start-check unit 603, a normal game running unit 605, a bonus game start determining unit 606, a bonus game execution unit 607, a random number sampling unit 615, a symbol determining unit 612, an effect-use random number sampling unit 616, an effect determining unit 613, a speaker unit 617, a lamp unit 618, a winning determining unit 619, and a payout unit 620.

The normal game running unit 605 has a function of running a normal game when an operation of the BET button 601 is made. The bonus game start determining unit 606 determines whether to run a bonus game, based on a combination of the symbols 501 rearranged in the normal game. That is to say, the bonus game start determining unit 606 has a function of determining that a bonus game is obtained when a trigger symbol or the like is rearranged in a predetermined condition, and shifting the process to the bonus game execution unit 607 so that a bonus game is run from the next unit game.

It is noted that “unit game” is a series of operations from the start of the receiving of a bet to a state in which an award can be established. For example, a unit game in the normal game includes a single bet time for receiving a bet, a single game time of rearranging stopped symbols 501, and a single payout time of a payout process of awarding a payout. A unit game in the normal game is termed unit normal game.

The bonus game execution unit 607 has a function of running a bonus game in which a free game is repeated only by an operation of the spin button 602.

The symbol determining unit 612 has functions of: determining symbols 501 to be rearranged with reference to a random number from the random number sampling unit 615; rearranging the determined symbols 501 on the symbol display region 614*a* of the display 614; outputting rearrangement information of the symbols 501 to the winning determining unit 619; and outputting an effect specifying signal to the effect-use random number sampling unit 616 based on the state of the rearrangement of the symbols 501.

The effect-use random number sampling unit 616 has a function of sampling an effect random number when receiving an effect instruction signal from the symbol determining unit 612 and a function of outputting the effect random number to the effect determining unit 613. The effect determining unit 613 has a function of determining the effect content by using the effect random number, an effect of outputting the image information of the determined effect content to the image display region 614*b* of the display 614, and a function of outputting audio/light information of the determined effect content to the speaker unit 617 and the lamp unit 618.

The winning determining unit 619 has a function of determining the presence of winning when obtaining rearrangement information of the symbols 501, which is a display state of rearrangement on the display 614, a function of calculating a payout amount based on the winning combination when it is determined that winning is achieved, and a function of outputting a payout signal to the payout unit 620 based on the payout amount. The payout unit 620 has a function of paying out a gaming value to the player, in the form of a coin, a medal, a credit, or the like. Furthermore, the payout unit 620 has a function of adding credit data corresponding to the credit to be paid out to credit data stored in an IC card 500 inserted into the later-described PTS terminal 700.

In addition to the above, the game controller 100 includes a not-shown storage unit that stores various types of bet amount data. The storage unit stores data in a rewritable manner, e.g., a hard disc device and a memory.

In addition to the above, the game controller 100 has a common game running unit 653. The common game running unit 653 has functions of: outputting bet amount information based on a bet amount bet on a normal game to the external controller 621 in each unit basic game; executing a common game in response to a game start command from the external controller 621; and receiving a bet input through the BET button 601 for a bet amount corresponding to bet amount data for a common game, which is bettable on a common game.

In addition to the above, the game controller 100 is connected to the PTS terminal 700. The PTS terminal 700 is a unit in which an LCD, a microphone, a human body detection camera, etc. are integrated, and has, for example, a function of executing an effect for a game by mutual communications with the game controller 100. In addition to the above, when receiving credit data from the PTS terminal 700, the game controller 100 updates the credit display on the display 614. Furthermore, the game controller 100 outputs settled credit data to the PTS terminal 700 when the credits on a game are settled.

Furthermore, the PTS terminal 700 of each of the slot machines 10 constituting the gaming machine 300 is connected to the management server 800 to be able to communicate each other, and centrally manages the download of images, IC cards and credits.

Further, the game controller 100 has an illumination unit 641 and an illumination light control unit 642. The illumination unit 641 has a function of, emitting to the reel band M32, visible light 901 of a complementary color and visible light 901 other than the complementary color in a switchable manner. When emitting the visible light 901 other than the complementary color, the illumination unit 641 forms visual information 902 such as text information or the like on the reel band M32 by using the visible light 901.

The illumination light control unit 642 has a function of executing various processes to the illumination unit 641, at a predetermined timing. For example, the illumination light control unit 642 has a function of enabling the illumination unit 641 to perform switchover between the visible light of a complementary color and the visible light other than the complementary color, only when the rotation of all the reels M3 are stopped. In other words, the illumination light control unit 642 has a reel rotation detector 6421 configured to detect the presence/absence of the rotation of the reels M3; and a light changer 6422 configured to change the visible light 901 emitted to the reel band M32 when the rotation of all the reels M3 are stopped.

(Function Flow of Gaming Machine 300: External Controller)

The gaming machine 300 with the above-described structure is connected to an external controller 621. The external controller 621 has a function of remotely operating and monitoring the operation state of each slot machine 10 and processes such as changes in game setting values. Furthermore, the external controller 621 has a function of determining a common game start condition for each gaming terminal, and executing a common game at a plurality of slot machines 10 when a determination result at any gaming terminal satisfies the common game start condition. Further, the external controller 621, when starting the common game, performs a predetermined emitting operation in which, for example, the visible light 901 is repetitively emitted and stopped, so as to notify the player of the start of the common game on the display window 150 of the reels M3 as well.

More specifically, the external controller 621 includes a common game start unit 6213, a gaming terminal selection unit 6215, and a transceiver unit 6217. The common game start determining unit 6213 has functions of: determining whether the common game start condition is established based on the accumulated bet amount information sent from the slot machine 10 in each unit basic game; outputting a game start command to a plurality of slot machines 10; and displaying on the common display device 700 states until the common game start condition is established.

The determination as to whether the common game start condition is established is based on the accumulated bet amount information or based on all accumulated values that increase as the unit basic game is repeated. For example, the number of times of running the basic game and the game time of the basic game may be used as the accumulated values.

In addition to the above, the common game start unit 6213 has a function of outputting a game start command to the slot machine 10 in which an accumulated value that increases as a result of the repetition of the basic game satisfies a game running condition. With this, because the right to participate in the common game is not awarded to a slot machine 10 in which the accumulated value is lower than the minimum setting value, the common game start unit 6213 motivates the player to actively repeat the basic game.

In addition to the above, the common game start unit 6213 has a function of monitoring a non-input time in which no start operation is performed, and outputting the game start command to the slot machines 10 except to the slot machine 10 in which the non-input time is equal to or longer than a timeout time. With this, the common game start unit 6213 is able to determine that no player is at a slot machine 10 where the basic game has not been played at least for the timeout time, and able to avoid the execution of the common game at such a slot machine 10.

The gaming terminal selection unit 6215 has a function of selecting a specific slot machine 10 from the slot machines 10 and outputting a common game start command signal to that specific slot machine 10. The transceiver unit 6217 has a function of exchanging data with the slot machines 10.

(Overall Structure of Game System)

A game system 350 including the gaming machine 300 having the functions above will be described.

Figure 5:
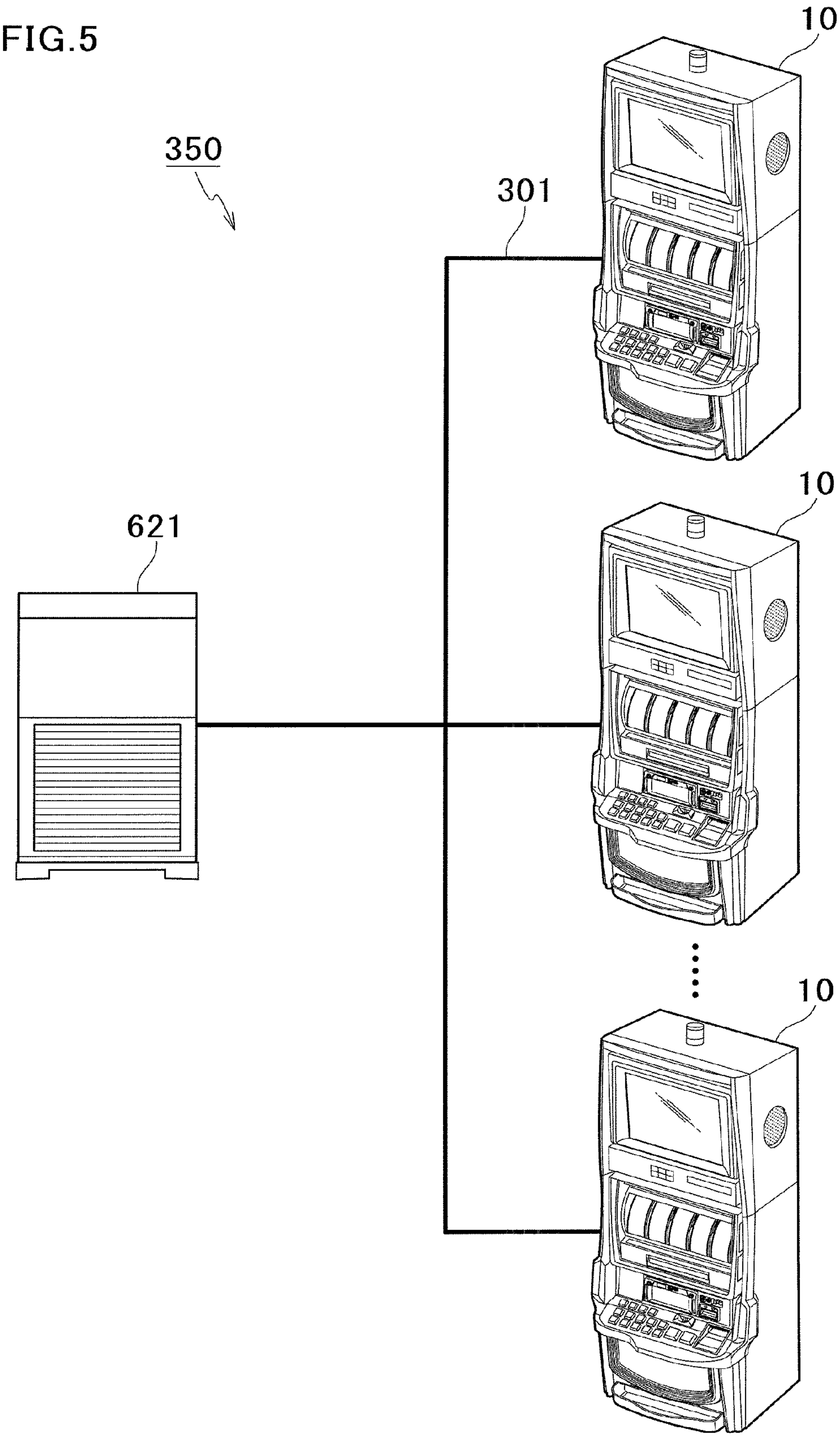
FIG. 5 is a perspective view showing the overall gaming machine.

As shown in FIG. 5, the game system 350 includes the slot machines 10 and the external controller 621 connected to the slot machines 10 over a communication line 301.

The external controller 621 is configured to control the slot machines 10. In the present embodiment, the external controller 621 is a so-called hall server provided in a gaming facility where a plurality of slot machines 10 are provided. Each slot machine 10 has a unique identification number, and the external controller 621 determines the source of data sent from the slot machines 10 based on the identification number. Furthermore, the identification number is used to specify the transmission target, when data is sent from the external controller 621 to a slot machine 10.

The game system 350 may be constructed in a single gaming facility where various games such as casino games are playable or constructed for a plurality of gaming facilities. When constructed in a single gaming facility, the game system 350 may be constructed in each floor or section of the gaming facility. The communication line 301 may be wires or wireless, and is constructed by a dedicated line, a switched line, or the like.

(Mechanical Structure of Slot Machine)

Figure 6:
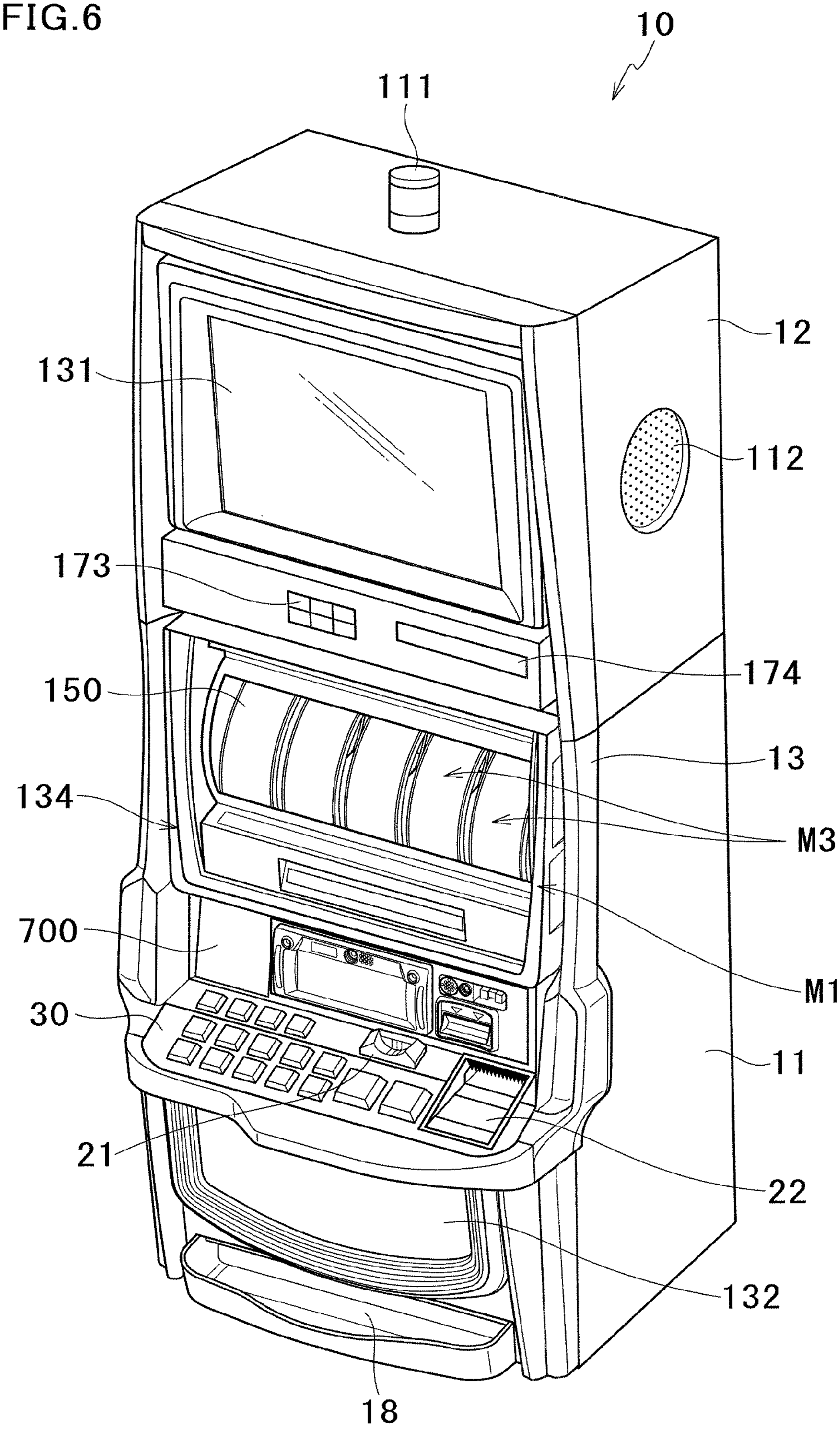
FIG. 6 is a perspective view showing a slot machine in the gaming machine.
Figure 7:
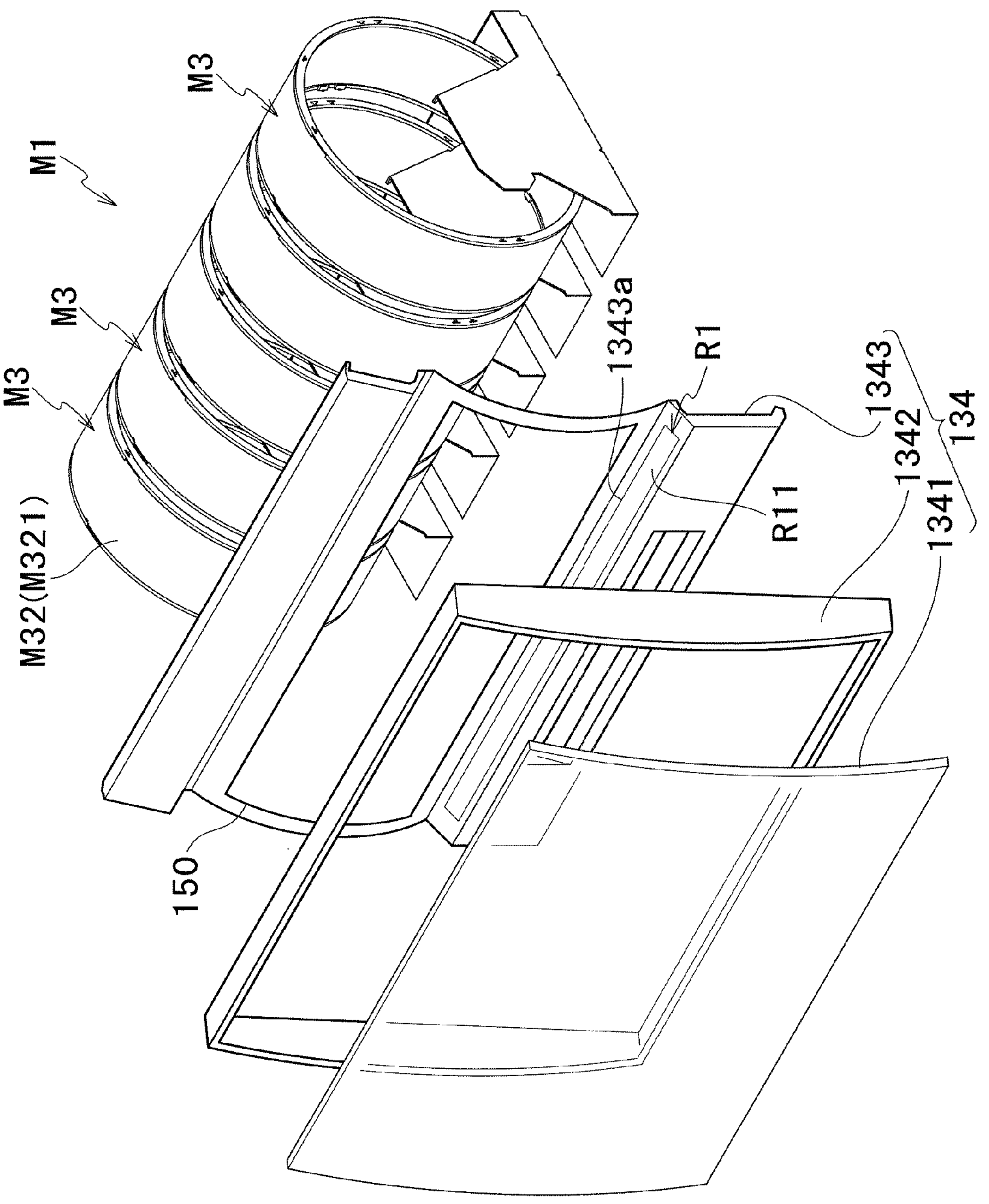
FIG. 7 is an exploded perspective view showing a reel device and a reel cover.

Referring to FIG. 6, the overall structure of the slot machine 10 will be described. A coin, a bill, or electrically valuable information corresponding to these is used as a game medium in the slot machine 10. In the present embodiment, in particular, credit-related data such as money data stored in an IC card 500 is used.

The slot machine 10 includes a cabinet 11, a top box 12 installed on the upper side of the cabinet 11, and a main door 13 provided at the front surface of the cabinet 11.

Figure 9:
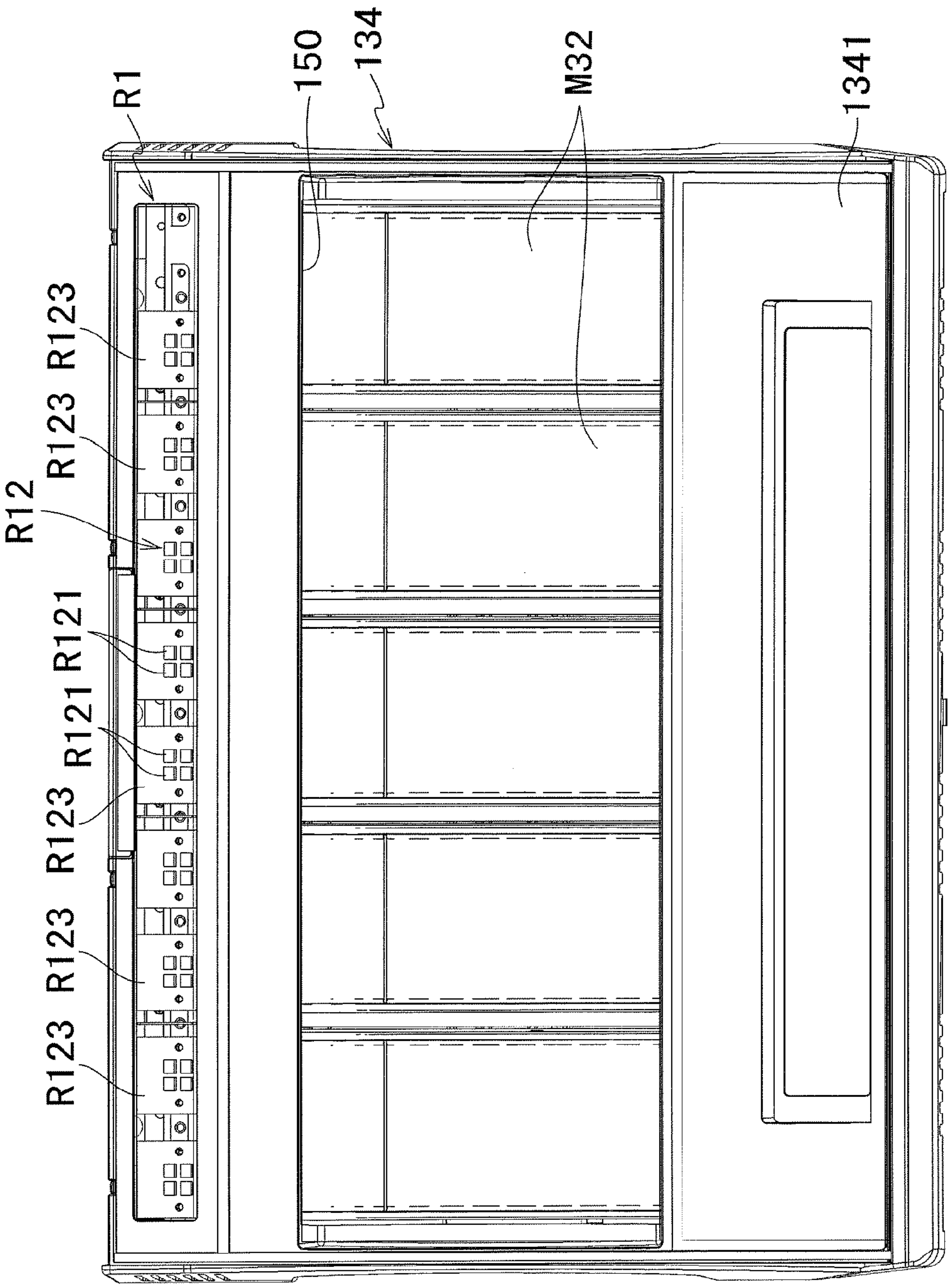
FIG. 9 is a front view of the reel cover.
Figure 10:
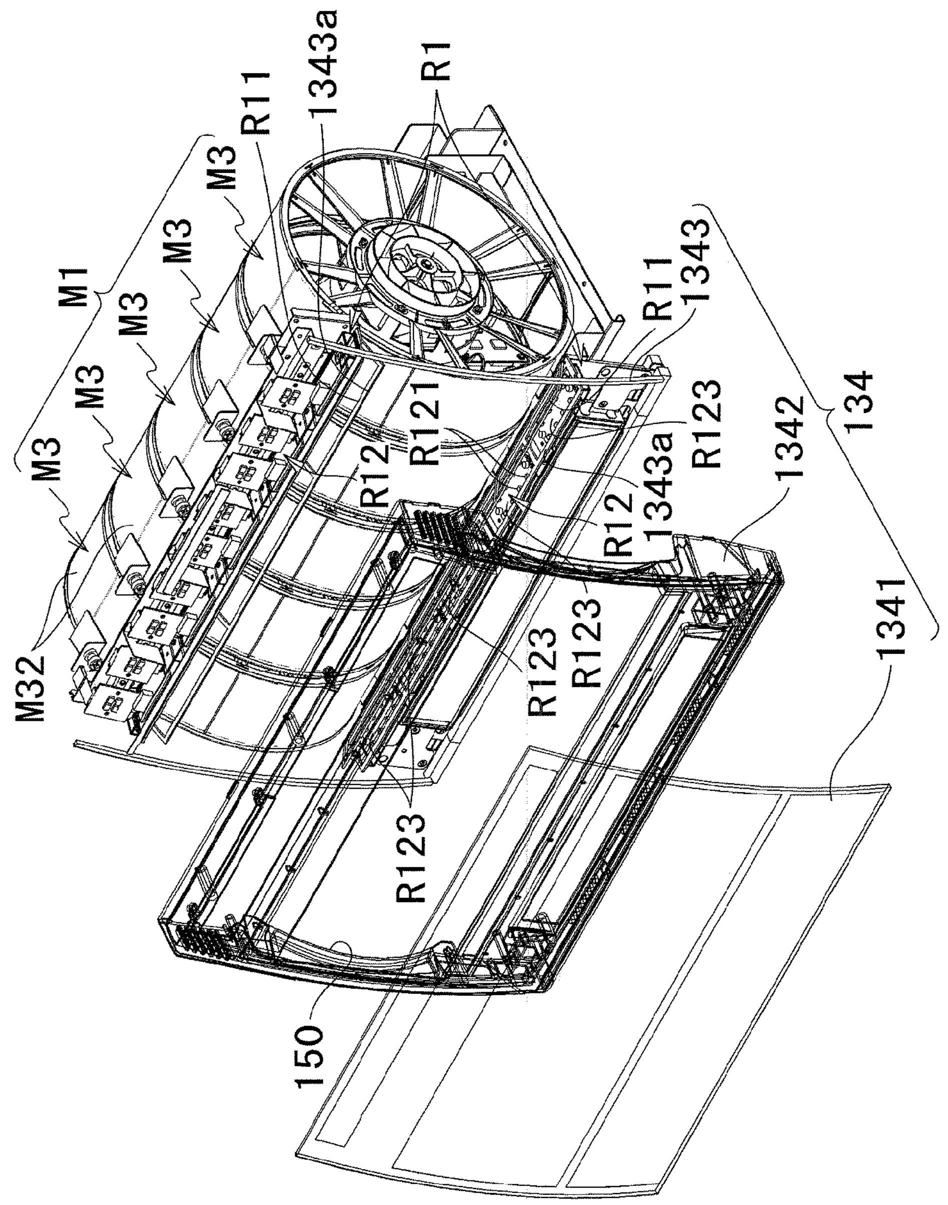
FIG. 10 is an exploded perspective view of the reel device and the reel cover.
Figure 11:
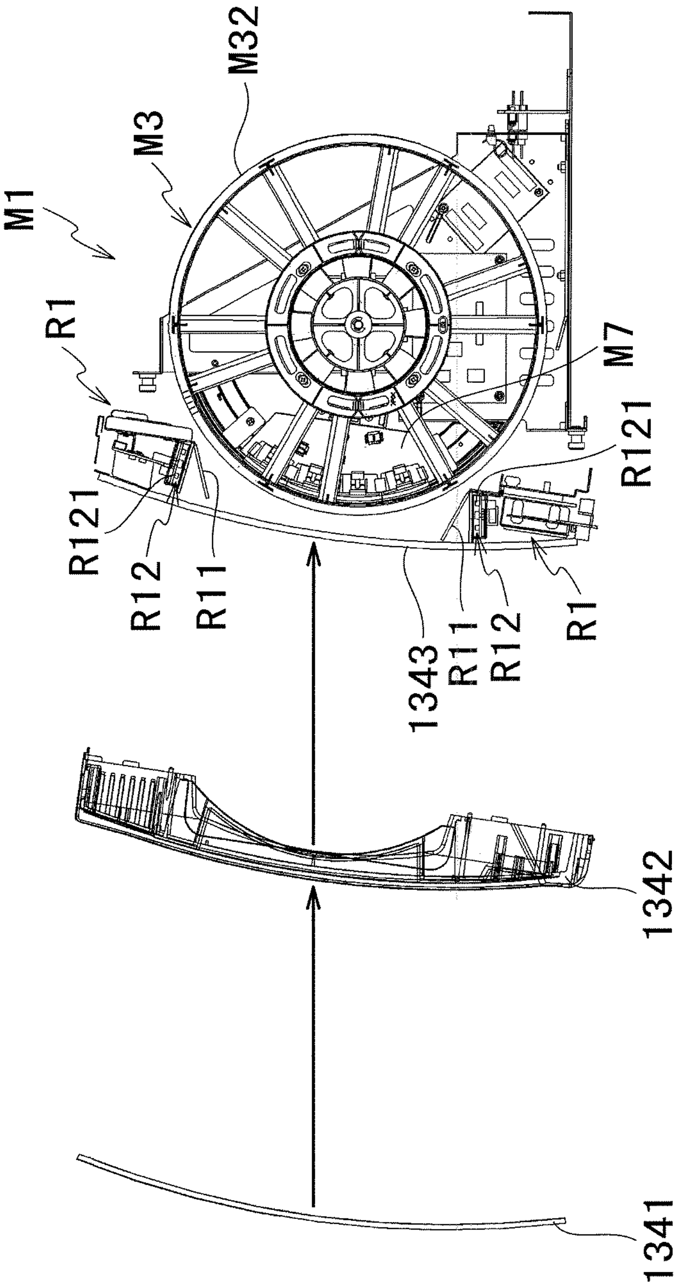
FIG. 11 is an exploded view of the reel device and the reel cover.
Figure 12:
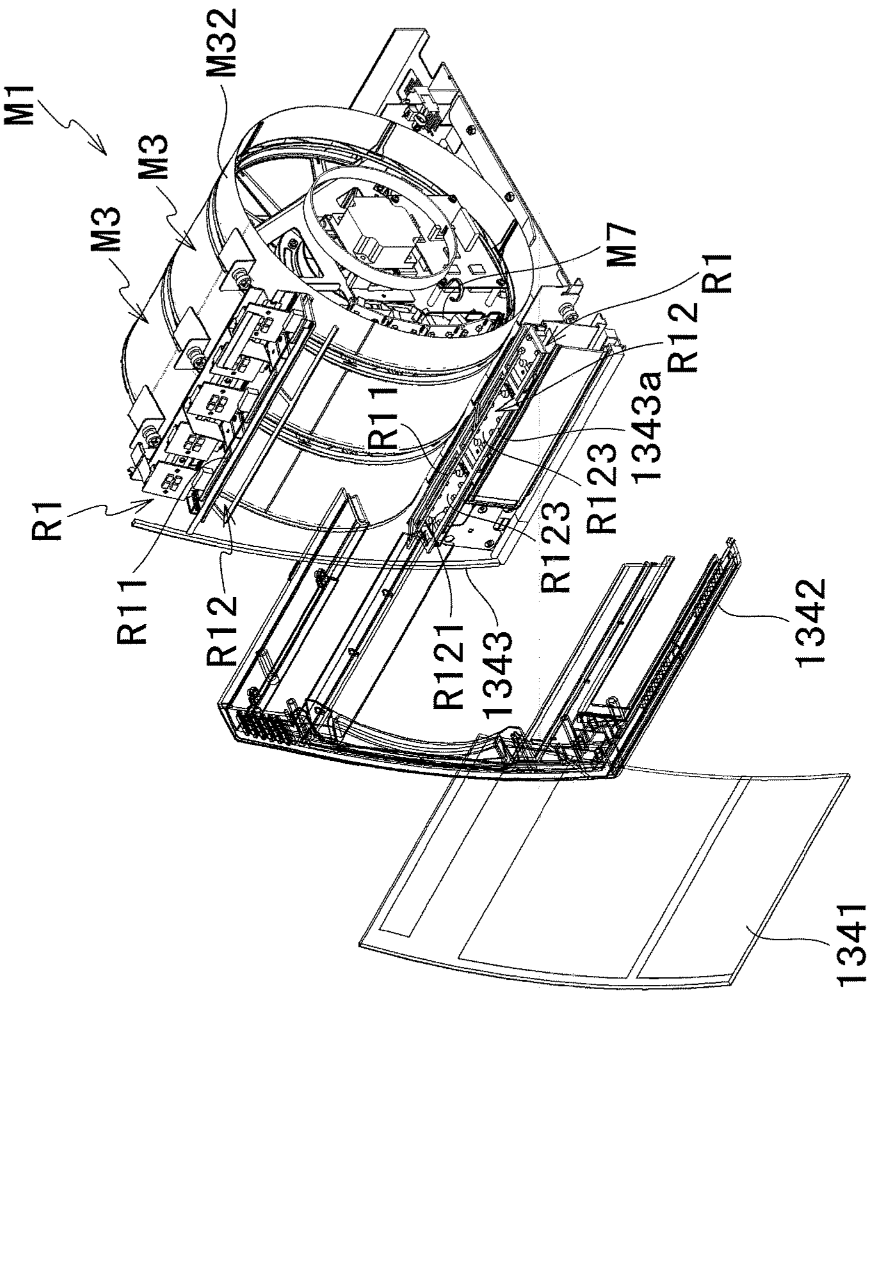
FIG. 12 is an exploded perspective view of a part of the reel device and the reel cover.
Figure 13:
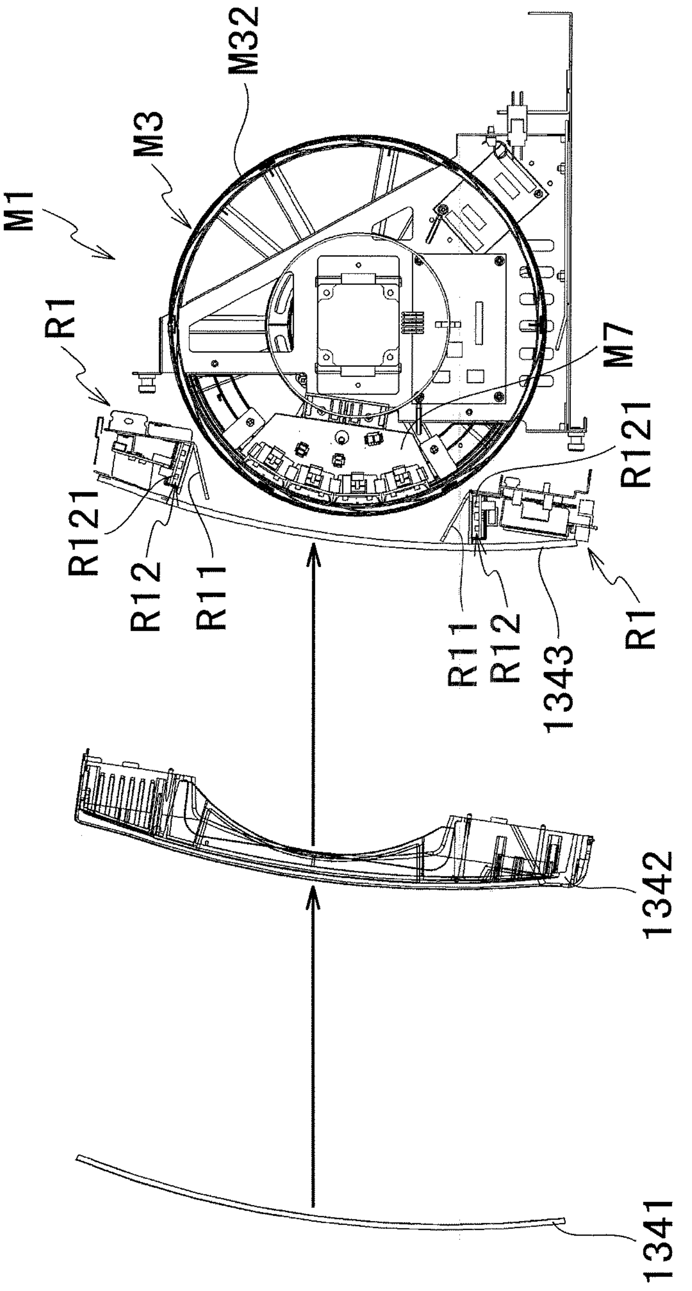
FIG. 13 is an exploded view of the reel device and the reel cover.
Figure 14:
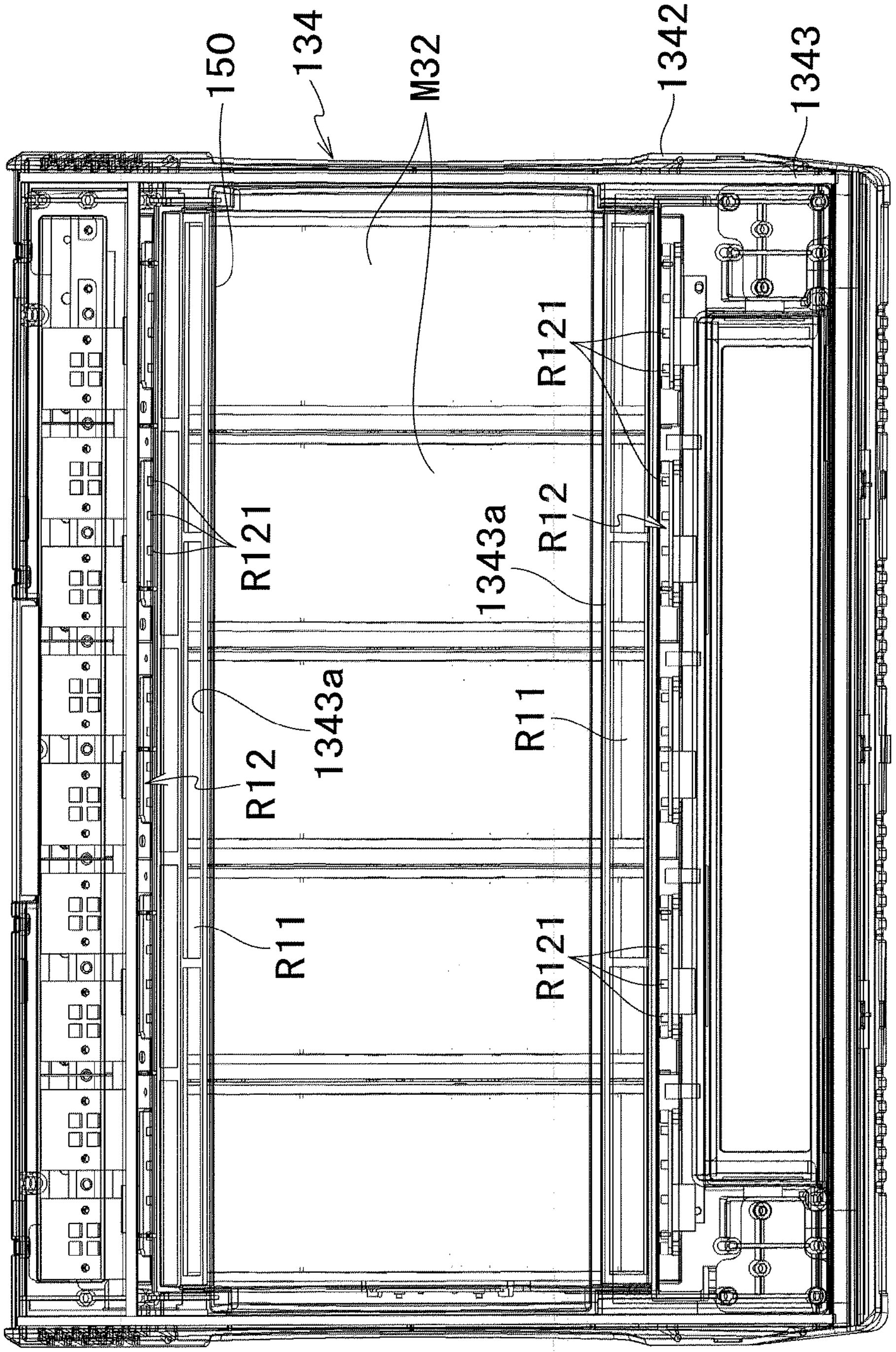
FIG. 14 is a front view of the reel cover.

The main door 13 is provided with a reel device M1. On the front surface of the reel device M1 is provided a reel cover 134. As shown in FIG. 7 and FIG. 9 to FIG. 14, the reel cover 134 has a transparent panel 1341, a panel frame 1342 provided on the front surface of the transparent panel 1341, and a panel supporter 1343 supporting the panel frame 1342. The panel supporter 1343 is provided with the light application device R1. As shown in FIG. 10 and FIG. 12, the light application device R1 has a transparent panel R11 provided at an opening 1343*a* of the panel supporter 1343, and a light source R12 for emitting visible light 901. The light application device R1 is detailed later.

As shown in FIG. 6, the reel cover 134 has a display window 150 at its center portion. The display window 150 is configured so that 20 symbols 501 of 5 columns and 4 rows are visible outside. Four symbols 501 in each column are a part of a symbol group arranged on the outer circumference surface of the reel M3. On each reel M3, the four symbols 501 thereon are moved downward or upward, while changing the overall speed. This enables rearranging of the symbols 501 displayed, by stopping them after rotating them longitudinally.

At the left and right edges of the display window 150, payline occurrence columns are provided in a symmetrical manner on the left and right. The left payline occurrence column on the left side when viewed from the player has 25 payline occurrence parts. The right payline occurrence column on the right side when viewed from the player has 25 payline occurrence parts.

The payline occurrence part on the left forms a pair with any payline occurrence part on the right. There are predetermined paylines each extending from a payline occurrence part on the left to the payline occurrence part on the right which is paired with that payline occurrence part on the left. There are 25 paylines.

The paylines are each activated when the payline occurrence parts on the left and right are connected. In other cases, the paylines are inactive. The number of activated paylines is determined based on a bet amount. When the bet amount is maximum, i.e., MAXBET, the upper limit of, i.e. 25 paylines are activated. An activated payline allows the symbols 501 to establish various types of winning combinations. Details of the winning combination will be given later.

Note that the present embodiment deals with a case where the slot machine 10 has the mechanical reel device M1; however, the slot machine 10 of the present invention may adopt a combination of the mechanical reels and video reels which display pseudo reels. Further, on the reel cover 134, a touch panel may be provided. In this case, the player is able to input various instructions by operating the touch panel. The input signal is transmitted from the touch panel to the main CPU 71. Further, the reel cover 134 may have a transparent liquid crystal panel instead of the transparent panel 1341. Adopting the transparent liquid crystal panel enables effects which are in combination of the symbols on the reel device M1, visual information 902 by the visible light 901 from the light application device R1, and an effect image displayed on the transparent liquid crystal panel.

Below the reel device M1 is arranged a control panel 30. The control panel 30 is provided with buttons, a coin entry 21 for inserting coins into the cabinet 11, and a bill entry 22.

On the lower front surface of the main door 13, i.e., below the control panel 30, a coin receiving slot 18 for receiving coins, a belly glass 132 on which a character of the slot machine 10 or the like is depicted are provided.

On the front surface of the top box 12 is an upper image display panel 131. The upper image display panel 131 is made of a liquid crystal panel, and structures a display. The upper image display panel 131 displays an image related to an effect, an image to introducing the game or explaining the rules of the game. Further, the top box 12 is provided with a speaker 112 and the lamp 111. In the slot machine 10, an effect is provided in the form of displaying an image, output of a sound, and output of light.

Below the upper image display panel 131 are provided a data displayer 174 and a keypad 173. The data displayer 174 includes a fluorescent display and an LED. For example, the data displayer displays member data read from an IC card 500 via the PTS terminal 700, or data input by the player by the keypad 173. The keypad 173 is for inputting data.

(Reel Device M1)

Figure 8:
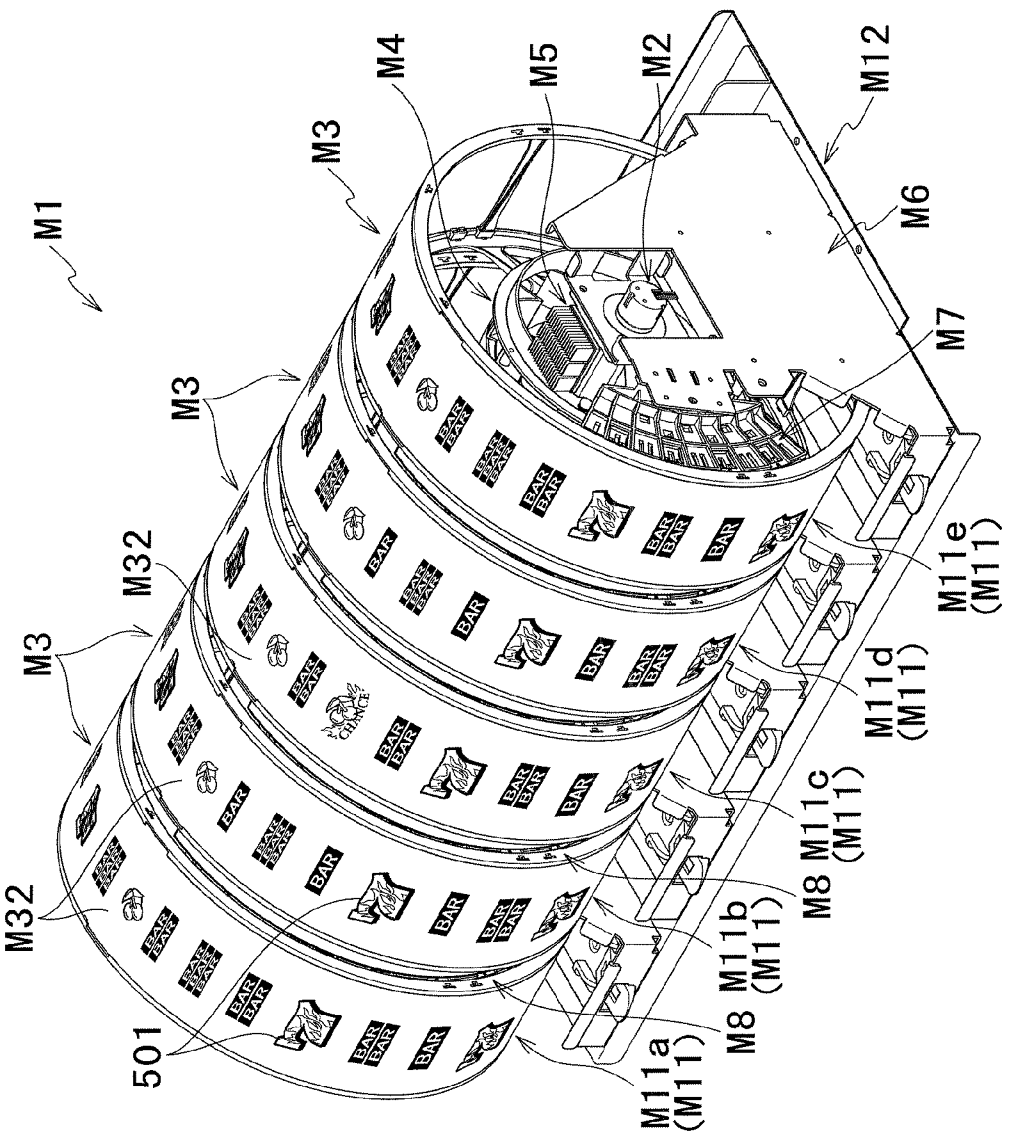
FIG. 8 is a perspective view of the reel device.

The reel device M1 provided to the slot machine 10 has a plurality of reels M3 which are supported so that the reels M3 are horizontally aligned and are concentric with each other as shown in FIG. 8. That is, the reel device M1 has reel units M11 each of which rearranges symbols 501 by rotating the reel M3 on which symbols 501 are aligned on the outer circumferential surface thereof, and a reel unit holding mechanism M12 configured to detachably hold the reel units M11. In the following description, each of the reel units M11 are referred to as a first reel unit M11*a* to a fifth reel unit M11*e*, from the left to right viewed from the front side, when the place of the reel unit M11 needs to be specified.

The reel unit M11 has a reel M3 having the symbols 501 aligned on its outer circumference surface, and a reel support mechanism M6 for supporting the reel M3. The reel M3 has an annular reel band M32 on which one or more symbols 501 are arranged.

Figure 16:
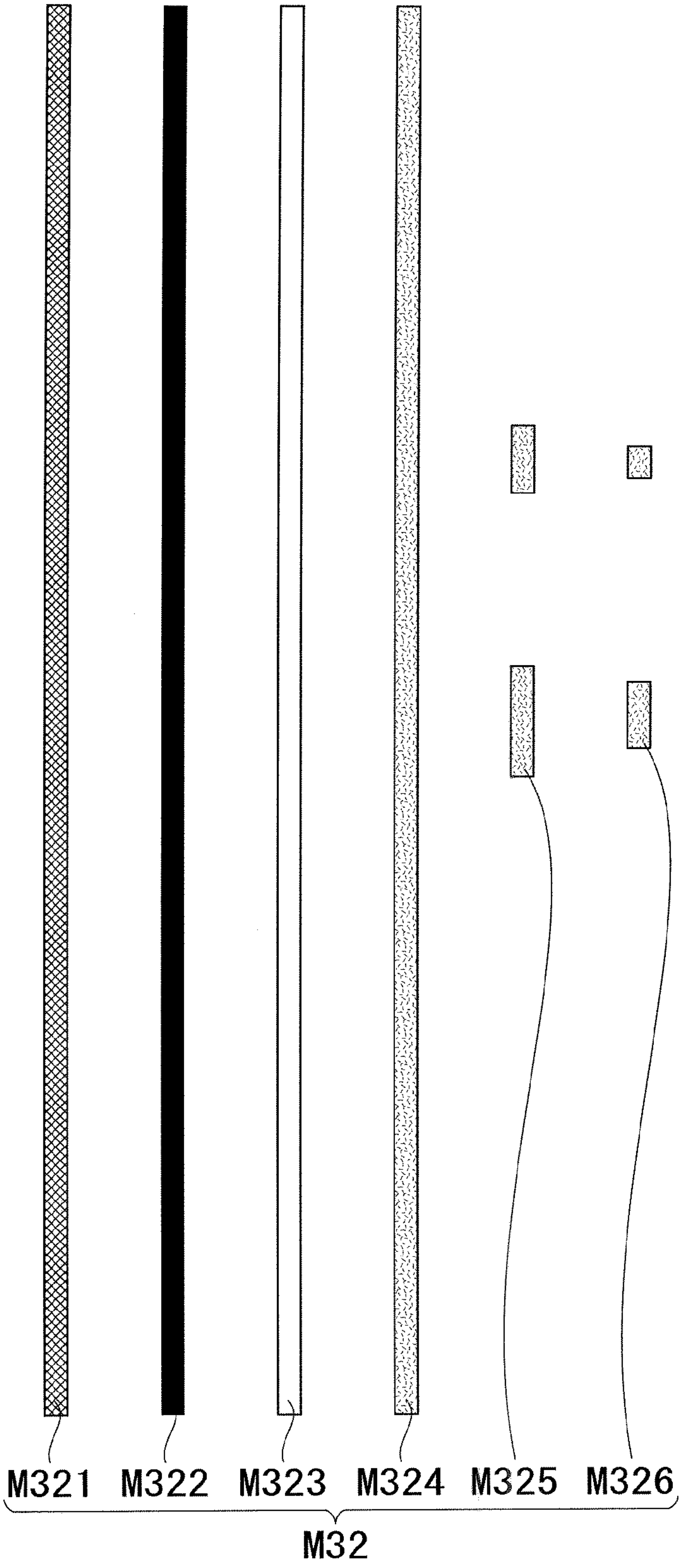
FIG. 16 is an explanatory diagram showing layers of the reel band.

As shown in FIG. 15 and FIG. 16, the reel band M32 has a half mirror layer M321, a symbol-printed layer M322, a limited-transparency layer M323, a first dispersion layer M324, a second dispersion layer M325, and a third dispersion layer M326. The half mirror layer M321 is made of a half mirror sheet, from which the outline of the symbols being cut out. The symbol-printed layer M322 is a black sheet on which symbols are printed. The white portions in the figure are transparent. The limited-transparency layer M323 is a white sheet which is slightly transparent so as to limit the amount of light passing through. The black portions in the figure are cut out. The first dispersion layer M324, the second dispersion layer M325, and the third dispersion layer M326 are each a light dispersing sheet which is formed to match with the symbols, and is formed by a flexible polyvinyl chloride (PVC).

The half mirror layer M321 is arranged so as to be position on the side of the front surface of the cabinet 11 which is on the side of the player. That is, the half mirror layer M321 is arranged on the outermost circumference surface of the reel M3. On the side of the inner circumference surface (back surface side) of the half mirror layer M321, the symbol-printed layer M322, the limited-transparency layer M323, the first dispersion layer M324, the second dispersion layer M325, and the third dispersion layer M326 are arrange in this order.

Note that the half mirror layer M321 has on its front surface side a transparent protection layer. Further, on the front surface side of the half mirror layer M321, there is formed a screen layer which allows the symbols 501 to appear only when the backlight is turned off. The screen layer has a mirror structure which reflects thereon light coming from the front surface. This way, even when the backlight is turned off, the illumination light of the hall reflects on the screen layer, and the symbols 501 positioned at the back of the screen layer disappear. When the backlight is turned on, on the other hand, the light of backlight whose intensity is higher than that of the illumination light passes through the symbols 501 and the screen layer. Thus, the symbols 501 appear on the reel band M32.

When the screen layer is provided to the outermost circumference surface of the reel band M32, displaying and hiding of the symbols 501 are switched over by controlling the turning-on/off of the backlight. This, for example, enables an effect such that the symbols 501 to be used in the subsequent game developed from the basic game are increased or decreased; or an effect such that only a specific type of symbol 501 is displayed. Further, for example, when the display window 150 is capable of displaying the symbols 501 in three rows and five columns, it is possible to make only the symbols 501 in the middle row visible, while making the symbols 501 in the upper row and the lower row invisible. Further, when visible light 901 based on the visual information is emitted from the light application device R1 to the symbol positions in the upper row and the lower row not displaying the symbols 501, the visual information is displayed by reflecting it on the screen layer in the upper row and the lower row, while displaying the symbols 501 on the middle row. Further, it is possible to display the symbols 501 only in a specific column position.

(Reel Unit M11: Backlight Unit M7)

As shown in FIG. 8, a backlight unit M7 is provided on the inner circumference side of the reel M3 having the structure described above. The backlight unit M7 emits illumination light from the inner circumference side of the reel M3 towards the reel band M32. The illumination light having passed the reel band M32 is visible from outside the slot machine 10. Thus, it appears to the player as if the symbols 501 are displayed on the reel band M32.

(Reel Unit M11: Effect Light Emitter M8)

Further, on the side of the reel M3 is arranged an effect light emitter M8. The effect light emitter M8 is configured to emit a plurality of types of effect light so as to be seen from outside the slot machine 10. Thus, the effect light emitter M8 improves the freedom of the effect and the effect itself, when the reel M3 rotates, or when the symbols 501 are being rearranged.

(Light Application Device R1)

As shown in FIG. 17, FIG. 18, FIG. 9 to FIG. 14, the light application device R1 which emits light representing the visual information 902 to the reel M3 of the reel device M1 is arranged on the outer circumference side of the reel device M1. The light application device R1 is arranged above and below the reel device M1 having the reels M3. Thus, the light application device R1 is disposed in a position out of a sight area in which the reels M3 are visible from outside the cabinet 11 through the display window 150. The light application device R1 enables an effect on the display window 150, as is the effect on the display window 150 using the transparent liquid crystal panel or a half mirror arranged in front of the reels M3, by using reflection of visible light 901 applied to each reel M3. This way, the light application device R1 enables an effect on the display window 150, without a need of a space for arranging a transparent liquid crystal panel or the like in front of the reels M3.

Note that the light application device R1 is disposed in at least one of the positions above and below the reel device M1. Specifically, the light application device R1 may be disposed in an outside area in at least one of the positions above or below the display window 150, and is configured to emit visible light 901 which is wider than the entire width of all the reels M3 supported by the reel device M1.

Further, the light application device R1 is provided to the reel cover 134 which serves as a front surface wall of the display window 150. The light application device R1 and the reel cover 134 are formed into a unit. This way, the light application device R1 is attached at the same time the reel cover 134 is attached to the cabinet 11.

Note that the light application device R1 is set so as to apply visible light 901 to the front surface of the reel device M1. In other words, the light application device R1 is set so as to apply visible light 901 to a non-active range; i.e., an area other than the active range of the symbols 501.

Specifically, the light application device R1 has a transparent panel R11 (transparent member) provided to an opening 1343*a* of the panel supporter 1343; and a light source R12 configured to emit visible light 901. The transparent panel R11 is colored so as to render visual information 902 using a predetermined color created by the visible light 901 having passed through the transparent panel R11. The transparent panel R11 has substantially the same width as that of the reel device M1. Further, the light source R12 is configured to emit visible light 901 from the entire width of the transparent panel R11.

The light source R12 has a plurality of full color LEDs R121. Each full color LED R121 is a light source including light emitting diode chips of the three primary colors, i.e., red, green, and blue. The full color LED R121 is capable of creating visible light 901 of any given color by adjusting the amount of light of each light emitting diode. The full color LEDs R121 are arranged in a matrix in the directions of width and depth. Specifically, as shown in FIG. 9, the light source R12 includes LED units R123 arranged for the reels M3, respectively. Each LED unit R123 includes two sets of full color LEDs R121, aligned in the direction parallel to the width of the reel band M32. Each set of full color LEDs R121 includes four full color LEDs R121 arranged in 2 rows and 2 columns. This way, the position of the reel device M1 where the light is applied is adjustable by controlling the position of the full color LEDs to be lighted.

The light source R12 is configured to emit, in a switchable manner, visible light 901 of a complementary color for the color of the transparent panel R11, and visible light 901 of a color other than the complementary color. Specifically, when the transparent panel R11 is colored red, the light source R12 emits visible light 901 of green which is a complementary color of red, and visible light 901 of red which is a color other than green in a switchable manner. By performing switchover between the visible light 901 of a complementary color and visible light 901 of a color other than the complementary color, the light application device R1 enables switching over between displaying and hiding of the visual information 902 ("CHANCE ZONE") on or from the reels M3.

Note that the light source R12 of the present embodiment deals with a case where the visible light 901 of a complementary color and the visible light 901 of a color other than the complementary color are easily formed by a single full color LED; however formation of the visible light 901 is not limited to the full color LED, and it is possible to adopt a monochrome LED which outputs visible light 901 of a complementary color and a monochrome LED which outputs visible light 901 of a color other than the complementary color.

Figure 17:
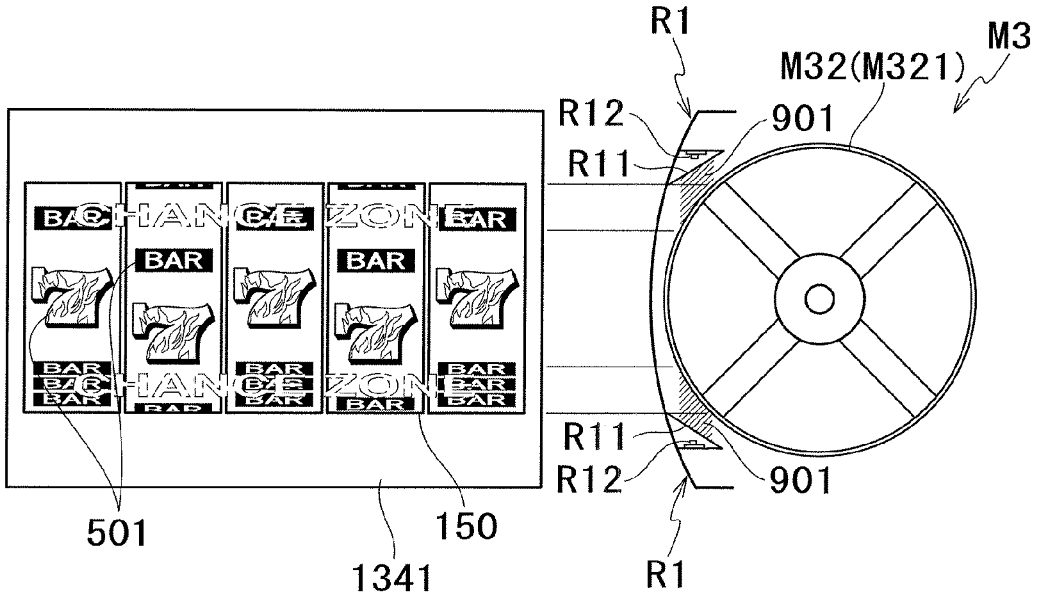
FIG. 17 is an explanatory diagram showing a state where a complementary color light is applied.
Figure 18:
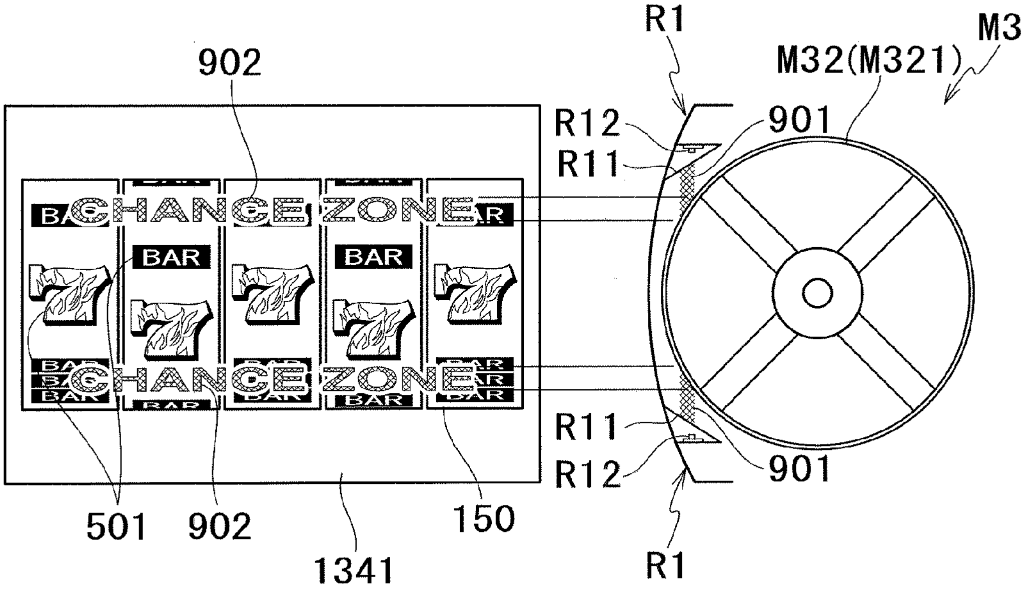
FIG. 18 is an explanatory diagram showing a method of forming visual information.

Note that the reel bands M32 of the reel device M1 may have a blank symbol as a type of symbol 501. This allows displaying of visual information 902 on the reel band M32 with a use of the visible light 901, in addition to the symbols 501 on the reel band M32, by structuring the light application device R1 so as to apply visible light 901 to a blank symbol formation area to display visual information 902, as shown in FIG. 17 and FIG. 18. Thus, the design of the reel band M32 and the types of the symbols 501 can be significantly modified or increased.

(Depth Display of Visual Information)

The light application device R1 with the above structure is disposed in a position out of a sight area in which the reels M3 are visible from outside the cabinet 11 through the display window 150, and enables depth display of visual information 902. Note that the "depth display of visual information 902" means displaying of visual information so as to cause the player to sense as if the information is displayed on the inner circumference side of the reel M3 than the reel band M32.

This depth display is specifically described with reference to FIG. 2. Namely, the wording "visually" means that visible light 901 reflected on an object is incident to the eyes of the player. The visible light 901 here has such a property that travels straight if there is not obstacle along the way. If there is an obstacle, the light is reflected on this obstacle. Reflection here follows the law of reflection; i.e., the incident angle θ1 and the reflection angle θ2 are the same.

In the present embodiment, the visible light 901 is reflected on the half mirror layer M321 of the reel band M32. Accordingly, the symbols 501 on the reel band M32 are made visible by the reflection of the visible light 901 on the reel band M32.

On the other hand, since the half mirror layer M321 serves as a mirror, the visual information 902 in the form of visible light 901 is seen through the following route. Namely, there is plotted the point of symmetry-A' for the point-A, where the display of visual information 902 is formed, with respect to a tangent line of the position of the reel M3 where the visible light 901 is reflected. Note that "the point-A, where the display of visual information 902 is formed" means a position of the transparent panel R11, where the visible light representing the visual information 902 passes. That is, an image is formed at the point-A'. Next, the point of symmetry-A' and the position B which is a point where light reaches, i.e., the point of view of the player, are connected by a line. When connecting a point O which is the intersection of the reel M3 with the line connecting the point of symmetry-A' and the position B, i.e., the point of view of the player, it is found that the visible light 901 is reflected on the intersection O, and reaches to the position B.

In this case, when the visible light 901 is incident on the player's eyes, the player would not recognize the visible light 901 as the reflection at the point O, but as light having traveled straight. Therefore, to the eyes of the player, it appears as if the visual information 902 is displayed at the point-A' at the backward side.

Thus, in cases where the visual information 902 is displayed in a symbol position at the time of viewing the symbols 501 on the reel M3 from outside the cabinet 11 through the display window 150, it appears as if the visual information 902 is arranged in a position at the reel inner circumference side (backward side) from the symbol position by a distance from the position of arranging the light application device R1, since the visual information 902 is the reflection of the visible light 901 from the light application device R1 disposed in a position out of the sight area.

(Electrical Configuration of Slot Machine)

Figure 21:
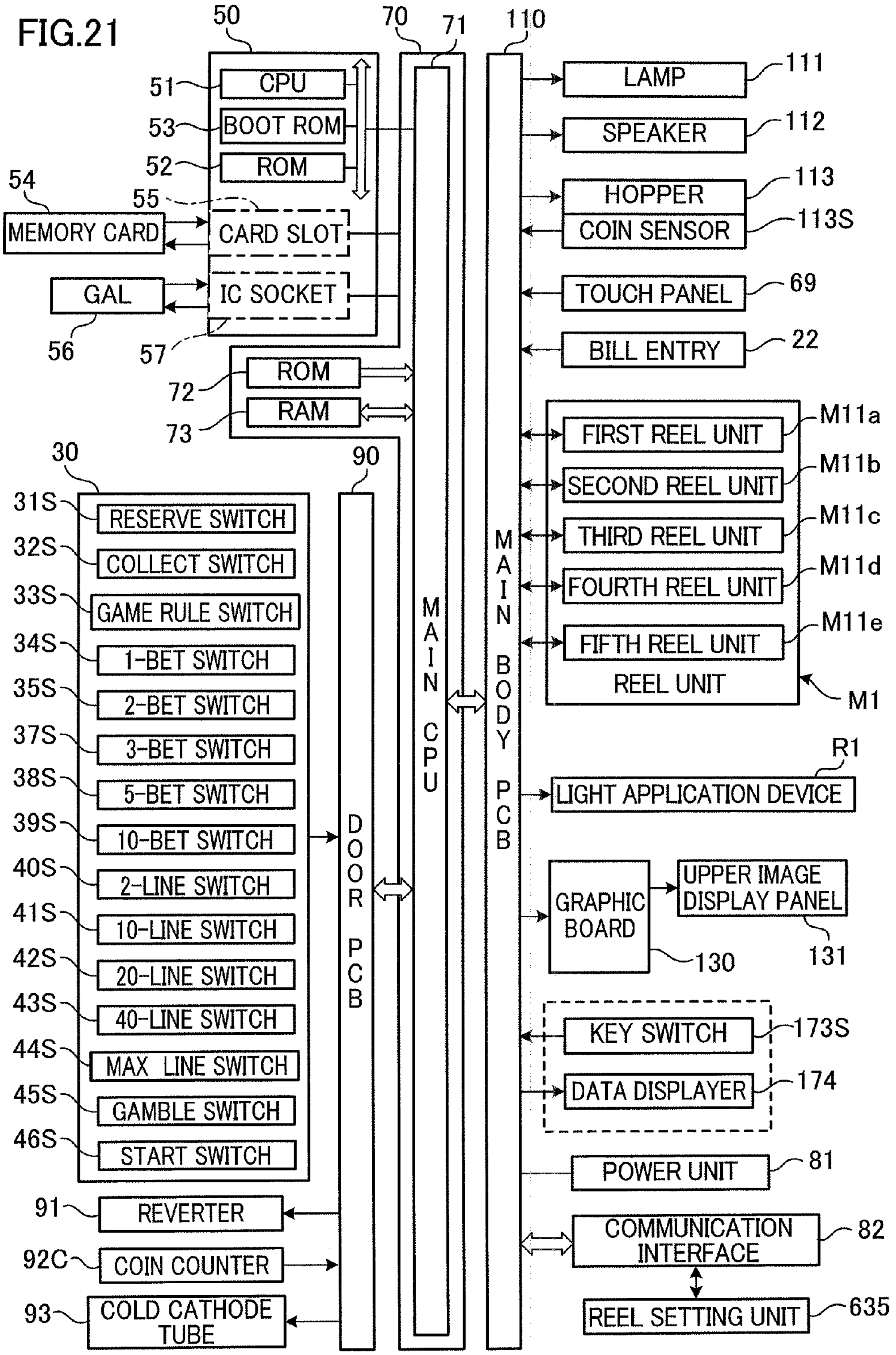
FIG. 21 is an electric block diagram of the slot machine.

Now, referring to FIG. 21 the configuration of a circuit in the slot machine 10 will be described.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression and a program for producing effects by images and sounds the game program further includes a symbol determination program. The symbol determination program is a program for determining symbols to be rearranged on the display block 28.

The game program further includes sets of data such as: normal game symbol table data indicating a normal game symbol table that shows the relationship of each symbol in each symbol array of the display block, a code number, and a random number; bonus game symbol table data indicating a bonus game symbol table that shows the relationship of each symbol of each symbol array of the display block, a code number, and a random number; symbol number determination table data indicating a symbol column determination table; code number determination table data indicating a code number determination table; wild symbol increase amount determination table data indicating a wild symbol increase amount determination table; trigger symbol increase number determination table data indicating a trigger symbol increase number determination table; odds data indicating the relationship between the types and the number of rearranged symbols on a payline L and a payout amount.

Further, the card slot 55 is configured so that the memory card 54 can be inserted thereinto and removed therefrom, and is connected to a motherboard 70 by an IDE bus. The type and contents of the game to be played on the slot machine 10 can be changed by drawing out the memory card 54 from the card slot 53S, writing another game program into the memory card 54, and inserting the memory card 54 into the card slot 53S.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the slot machine 10 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been falsified.

The motherboard 70 is constituted by a commercial general-purpose mother board (printed writing board on which basic components for personal computers are mounted) and is provided with a main CPU 71, a ROM (Read Only Memory) 72, a RAM (Random Access Memory) 73, and a communication interface 82. This motherboard 70 is equivalent to the game controller 100 of the present embodiment.

The ROM 72 includes a memory device such as a flash memory, and stores a program such as BIOS (Basic Input/Output System) to be executed by the main CPU 71, and permanent data. When the BIOS is executed by the main CPU 71, processing for initializing predetermined peripheral devices is conducted. Further, through the gaming board 50, processing of loading the game program and the game system program stored in the memory card 54 is started. In the present invention, the ROM 72 may be or may not be rewritable.

The RAM 73 stores data used for the operation of the main CPU 71 and programs such as the symbol determination program. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the number of bets, the number of payouts, the number of credits and the like; and an area that stores symbols (code numbers) randomly determined.

The communication interface 82 is for communicating with the external controller 621 such as a server, through the communication line 301. Further, the motherboard 70 is connected with a later-described door PCB (Printed Circuit Board) 90 and a body PCB 110 by respective USBs. The motherboard 70 is also connected with a power supply unit 81. Furthermore, the motherboard 70 is connected with the PTS terminal 700 by USB.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a reserve switch 31S, a collect switch 32S, a game rule switch 33S, a 1-BET switch 34S, a 2-BET switch 35S, a 3-BET switch 37S, a 5-BET switch 38S, a 10-BET switch 39S, a play-2-lines switch 40S, a play-10-lines switch 41S, a play-20-lines switch 42S, a play-40-lines switch 43S, a MAX LINE switch 44S, a gamble switch 45S, and a start switch 46S, which correspond to the above-described buttons. Each of the switches outputs a signal to the main CPU 71 upon detection of press of the button corresponding thereto by the player.

Inside the coin entry 36 are provided a reverter 91 and a coin counter 92C. The reverter 91 verifies validates a coin inserted into the coin entry 36, and discharges coins other than genuine coins through a coin payout exit. The coin counter 92C detects the received genuine coins and counts the number of the coins.

The reverter 91 operates based on a control signal output from the main CPU 71, and distributes valid coins validated by the coin counter 92C into a hopper 113 or a cash box (not shown). That is, coins are distributed into the hopper 113 when the hopper 113 is not filled with coins, while coins are distributed into the cash box when the hopper 113 is filled with coins.

The cold cathode tube 93 functions as a backlight installed on the upper image display panel 131, and lights up based on a control signal output from the main CPU 71.

The body PCB 110 is connected with, the reel device M1, the light application device R1, the lamp 111, the speakers 112, the hopper 113, a coin detecting portion 113S, the bill entry 22, a graphic board 130, a key switch 173S, and the data displayer 174.

The lamp 111 turns on based on control signals output from the main CPU 71. The speakers 112 output BGM sound or the like in accordance with a control signal output from the main CPU 71.

The hopper 113 operates based on a control signal output from the main CPU 71, and pays out coins of the specified number of payouts from the coin payout exit to an unillustrated coin tray. The coin detecting portion 113S outputs a signal to the main CPU 71 upon detection of coins paid out by the hopper 113.

The bill entry 22 authenticates the bills and receives genuine bills into the cabinet 11. The bills received by the cabinet 11 are converted onto the number of coins, and the credits equivalent to the converted coins are added as the credits owned by the player.

The graphic board 130 controls display of images conducted by the upper image display panel 131, based on a control signal output from the main CPU 71. The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

The key switch 173S is provided in the keypad 173, and outputs a predetermined signal to the main CPU 71 when the keypad 173 has been operated by the player.

The data displayer 174 displays data read by the card reader 172 and data inputted by the player through the keypad 173, based on a control signal outputted from the main CPU 71.

(Processes of Game Program)

Figure 21A:
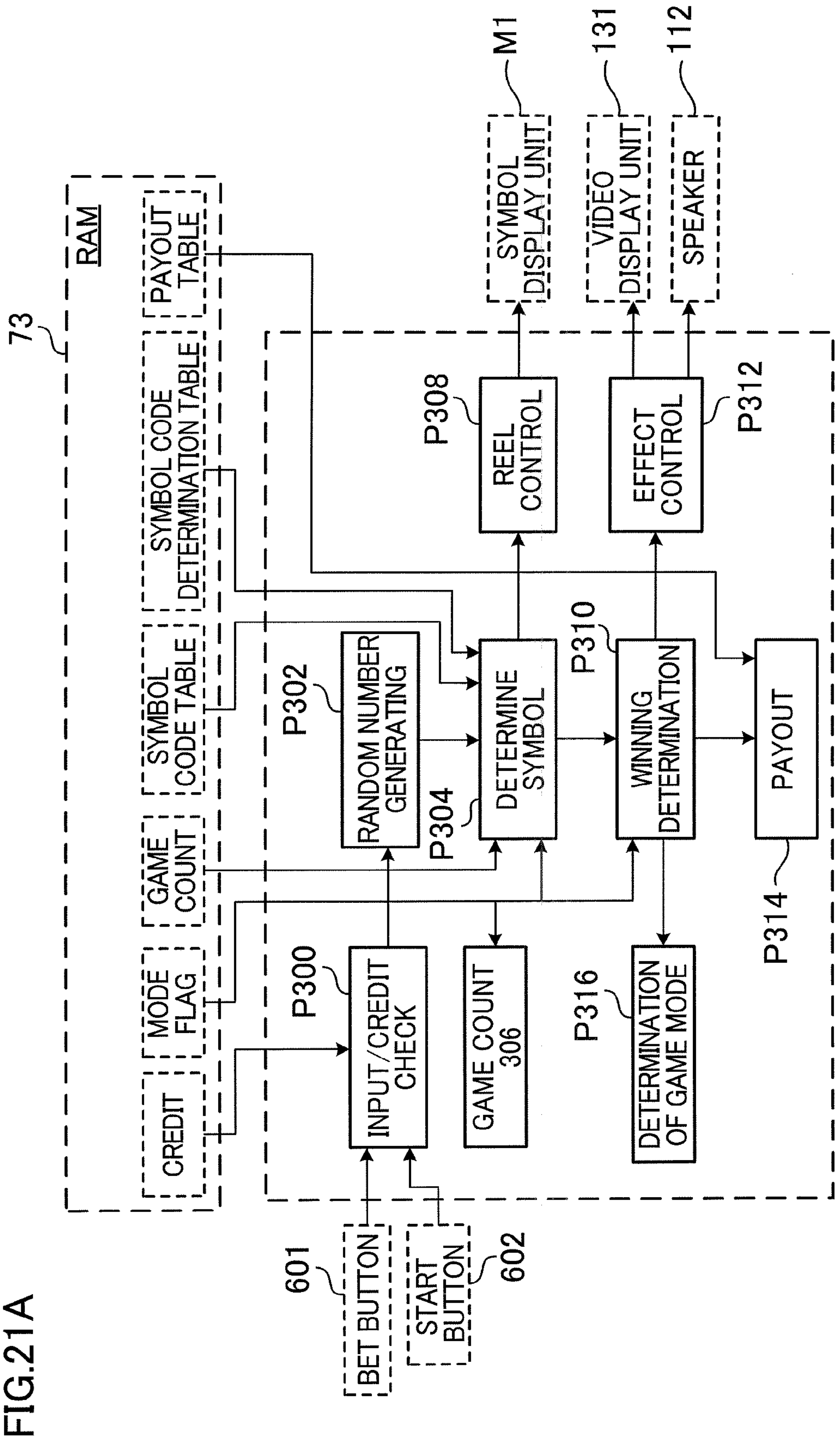

FIG. 21A is a block diagram showing a process of a main game program run by a main CPU 71 of the motherboard 70. When the power is supplied to the slot machine 10, the main CPU 71 loads authenticated game program and authenticated game system program from a memory card 54 via a gaming board 50 and Wright them into RAM 73. Through this, the game program is loaded into the RAM 73 and run.

In a preferable embodiment, the game program includes: an input/bet checking process P300, a random number generating process P302, a symbol determination process P304, a game counter, a reel control process P308, a winning determination process P310, an effect generating control process P312, a payout process P314, and a game mode determination process P316.

(Input/Bet Checking Process P300)

In the input/bet checking process P300, whether a "BET" button or a "START" button is pressed is continuously checked, during the idle state in which the reels M3 of the first to fifth reel units M11*a* to M11*e* are stopped. If the "BET" button 601 or the spin button 602 (start button) is pressed, whether there is any remaining player credit is checked based on the credit data 320 stored in the RAM 73, in the input/bet checking process P300. If there is at least one player credit, the random number generating process P302 is called from the input/bet checking process P300.

Then, in the random number generating process P302, a random number is generated for use in the symbol determination process P304. In the present embodiment, five random numbers are generated in the random number generating process P302. The five random numbers are used for reels M3 of the first to fifth reel units M11*a* to M11*e*, respectively.

After all the five random numbers are extracted, symbols to be stopped are determined for each reel M3, referring to the symbol code determination table stored in the RAM 73, in the symbol determination process P304. In the symbol determination process P304, the five random numbers are used to determine symbols to be stopped for five reels M3, and the symbols to be stopped are displayed on the reels M3 of the first to fifth reel units M11*a* to M11*e* of the reel device M1, through the display window 150.

In particular, in the symbol determination process P304, the current game mode is checked by referring to the mode flag 322 stored in the RAM 73. The process of determining the symbols is different between the normal mode and the chance mode. In the normal mode, the symbols are determined by using random numbers and a constant symbol code determination table, through a constant procedure, in the symbol determination process P304. In the chance mode on the other hand, the symbol determination process is changed by continuously changing the symbol code determination table for each of the unit games, in the symbol determination process P304. Continuously changing the symbol code determination table enables an increase in the probability of winning combination including at least one specific symbol, as the chance mode game continues. The number of chance mode games in a single session is limited to a predetermined number of times; e.g., eight times. To limit the number of chance mode games, the game counter 306 counts the number of chance mode games already played and/or the number of chance mode games remaining in the session. The value of game count is stored in the RAM 73. The game counter may be configured to belong to the symbol determination process P304.

In the reel control process P308, stop position information according to the symbols determined is supplied to control the reel device M1. This way, the reels M3 of the first to fifth reel units M11*a* to M11*e*, after the rotation, stop in positions designated by the stop position information. In other words, the symbols scroll with the rotation of the reels M3. Next, the reels M3 are stopped so that the symbols determined are rearranged in the middle position of the reel device M1 in the display window 150, relative to the vertical direction.

The winning determination process P310 determines whether or not the predetermined winning combination is formed by the rearranged symbols. When the winning combination is formed by the rearranged symbols, the reel device M1 and the another device are controlled in the effect generating control process P312. The other device may be a speaker 112, lamp, video display unit 131, or the like. Examples of an effect include one by video and audio, and one by changing of the backlight and illumination. Further, in the payout process P314, the amount of payout is determined according to the winning combination, and that amount of payout is awarded to the player.

Further, every time the unit game ends, the game mode of the subsequent unit game is determined in the game mode determination process P316. When the rearranged symbols cause a trigger event, there will be shifting from the normal mode to the chance mode in the game mode determination process P316. On the other hand, when the end condition is satisfied, there will be shifting from the chance mode to the normal mode in the game mode determination process P316. In other occasions, the game mode is maintained in the game mode determination process P316. The game mode determination process P316 may be executed in the winning determination process P310.

(Symbol, Winning Combination, and Payline)

FIG. 22 shows an exemplary symbol code table defining the symbols to be placed on the outer circumference surfaces of the reels M3 of the first to fifth reel units M11*a* to Mlle.

With the symbols on each reel M3, symbol arrays each including 11 symbols are formed. As described later, the alignments of symbols on the reels M3 are hereinafter referred to as first to fifth symbol arrays. In the present embodiment, each symbol array includes 6 types of symbols. The 6 types of symbols include: "7", "BAR", "Two BARs", "Three BARs", "Cherry", and "Chance Cherry". In each symbol array, codes "00" to "10" are allotted to the symbols, respectively. For example, the first symbol "BAR" in the first symbol array is given the code "00". The second symbol "7" in the first symbol array is given the code "01". The eighth symbol "7" in the first symbol array is given the code "07".

Three successive symbols out of each symbol array are shown on the reel device M1 through the display window 150. This forms a symbol matrix of 3 rows and 5 columns on the display window 150. Every time the "BET" button or the "START" button is pressed, the reels M3 with symbols start rotating, and shows the symbols 501 on the display window 150 in such a manner that the symbols 501 scrolls vertically on the display window 150. After a predetermined period, the scroll of symbols 501 is stopped, and the symbols are rearranged to form the symbol matrix on the display window 150.

Figure 23:
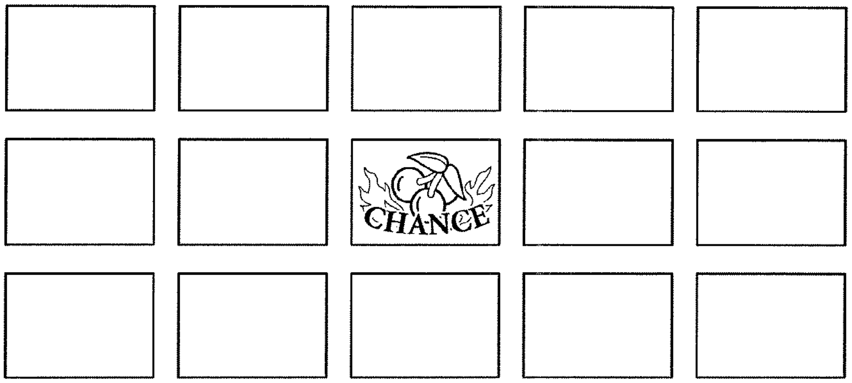
FIG. 23 is a diagram showing a state in which a trigger symbol is arranged in a predetermined position of a symbol matrix, and shows trigger conditions for shifting to a chance mode.

<"Chance Cherry" symbol> The "Chance Cherry" symbol appearing only on the third symbol array functions as a trigger symbol that shifts the game mode to the chance mode. In the present embodiment, the "Chance Cherry" symbol has a shape that resembles to the "Cherry" symbol; however, there is an image of a flame surrounding the cherry at the background, which is integrated into the image of cherry. The chance mode starts when the "Chance Cherry" symbol appears at the second position in the third column on the display window 150, as the result of rearrangement, as shown in FIG. 23. The condition for having the game mode return to the normal mode is described later.

There are a plurality of predetermined combinations of symbols that award a benefit to the player (hereinafter, referred to as "winning combination"). The benefit to be awarded to the player includes a predetermined amount of payout in the form of an increase in the credit, or returning coins.

Figure 24:
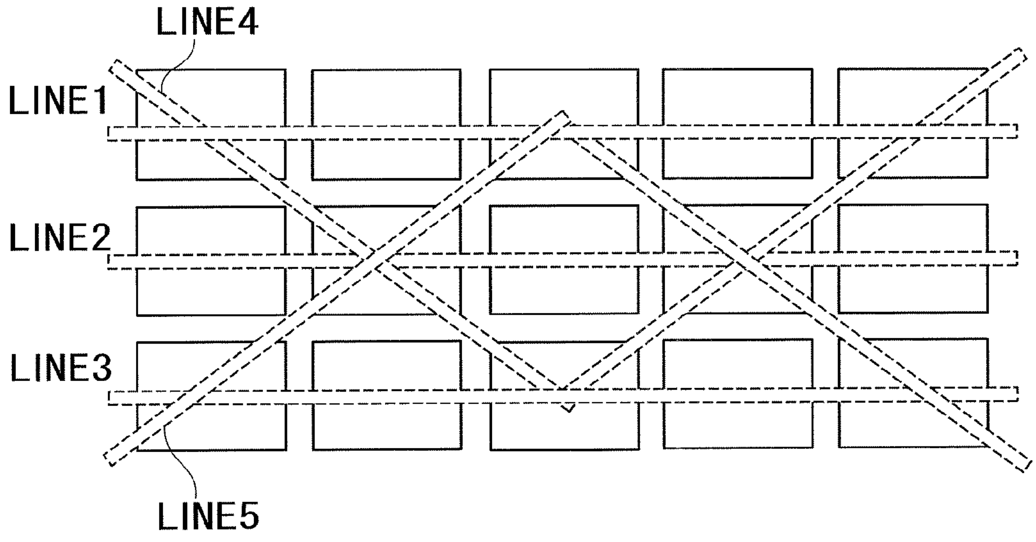
FIG. 24 is a diagram showing paylines of the gaming machine related to a first embodiment.

FIG. 24 indicates paylines determined in a preferable embodiment of the present invention. In the present embodiment, there are 5 paylines for the symbol matrix. The first to third paylines each extend in a horizontal direction, respectively through the first to third rows of the symbol stop positions in the symbol matrix. The fourth payline forms a "V" shape, and extends through the symbol stop positions of: the first row, the first column; the second row, the second column; the third row, the third column; the second row, fourth column; and the first row, fifth column. The fifth payline forms a counter "V" shape, and extends through the symbol stop positions of: the third row, the first column; the second row, the second column; the first row, the third column; the second row, the fourth column; and the third row, and the fifth column.

The paylines are each individually activated according to the player selection. Activating all the five paylines however is done, irrespective of the bet amount or the player selection. The total number of paylines is modifiable according to the size of the symbol matrix, and an additional payline may be set as needed.

(Game Mode (Normal Mode and Chance Mode))

The slot machine 10 has two modes (normal mode and chance mode) which are selectively switched from one to another. The processes of games in the chance mode are mostly the same as those of the normal mode. However, the payouts for at least some of the winning combinations in the chance mode are different from those of the normal mode. Further, the effects such as the video effect and the sound effect may be differentiated between the two game modes. Note that, in the present specification, the unit game run in the normal mode is sometimes simply referred to as normal mode game. Similarly, the unit game run in the chance mode is sometimes simply referred to as chance mode game.

(Shifting of Game State)

Figure 25:
FIG. 25 is a diagram showing transitions of the state of the gaming machine related to the first embodiment.

FIG. 25 is a diagram showing shifting of the states in the slot machine 10.

In the slot machine 10, the game mode is usually in the normal mode, and the normal mode is maintained unless a trigger event occurs. When a trigger event occurs during the normal mode, the game mode shifts to the chance mode. In the preferable embodiment, the trigger event is appearance of the "Chance Cherry" symbol at the second row in the third column of the symbol matrix.

When the game mode shifts to the chance mode, the slot machine 10 maintains the chance mode unless an end condition is satisfied. In an exemplary embodiment, one end condition is occurrence of one winning combination including a "7" symbol. Another example of the end condition is appearance of a "Cherry" symbol on one of the paylines in the symbol matrix formed by the rearranged symbols. After the game mode shifts to the chance mode, the slot machine 10 sets the game counter which counts up or counts down every time the unit game in the chance mode is run. A maximum number of unit games in the chance mode is 8 for one session of the chance mode. Here, the expression reading "one session of the chance mode" means that the period from the shifting of the game mode to the chance mode (i.e., the start of the chance mode) to the end. Thus, when the value of the game counter reaches 8 as the result of counting up, or reaches 0 as the result of counting down, the slot machine 10 causes the "Cherry" symbol to appear in the symbol matrix formed by the rearranged symbols, or causes a winning combination including the "7" symbol to occur. This operation is done by, for example, repeating the process of determining the symbol combination until a symbol combination satisfying the end condition is obtained. When the end condition is satisfied, the game mode is returned to the normal mode, and the unit games are resumed in the normal mode.

(Symbol Code Determination Table and Payout Table)

In either game mode, the symbol combination (e.g., including a combination of symbols to be stopped) is determined based on a plurality of tables stored in the RAM 73 of the motherboard 70. As hereinabove described, the RAM 73 stores at least one of the symbol code determination table and the symbol determination table.

FIG. 26 shows an exemplary structure of the symbol code determination table.

The symbol code determination tables 340 to 348 stores a mapping relation of the random numbers generated through the random number generating process P302 and the symbol codes of the symbols shown in FIG. 22. In other words, every time a random number is generated through the random number generating function 302, a symbol code corresponding to one symbol is determined, by referring to the symbol code determination tables 340 to 348, in the symbol determination process P304. When a range of random numbers is expanded, the symbol corresponding to that expanded range will be more likely determined. Further, when the entire range of the random numbers is expanded, it is possible to more accurately control the probabilities of the corresponding symbol codes being determined.

In the symbol code determination tables 340 to 348, the table 340 is used for determining the symbols in the normal mode, and the tables 341 to 348 are used for determining the symbols for a first to an eighth chance mode games.

When the first to fifth symbol arrays are different from one another, each of the symbol code determination tables 340 to 348 may be further divided into five tables corresponding to the symbol arrays, respectively. Further, as shown in FIG. 27, all the tables may be integrated into a single table having 45 data fields. This way, in the symbol determination process P304, one of the 45 data fields may be selectively used according to the game mode and the symbol array. In the present specification, each of the 45 data fields may be regarded as separate tables.

When two or more symbol arrays are identical to one another, a common symbol code determination table may be used to determine symbols for those symbol arrays. For example, in the example of FIG. 22, the second symbol array has the same symbol alignment as that of the fourth symbol array. Therefore, the symbol code determination table for the second symbol array may be used for determining the symbols of the fourth symbol array. Similarly, the first symbol array has the same symbol alignment as that of the fifth symbol array. Therefore, the symbol code determination table for the first symbol array may be used for determining the symbols of the fifth symbol array.

In the symbol determination process P304, when five symbols for one predetermined row (e.g., second row) of the symbol matrix are determined, and when all the symbols structuring the symbol matrix are determined, there is determined whether any of the winning combinations is formed. Then, the game mode of the subsequent unit games is determined in the game mode determination process P316.

FIG. 28 shows an exemplary symbol determination table. The symbol determination tables 360 to 368 regulate the probability of each symbol appearing on the payline. The symbol code determination tables 340 to 348 shown in FIG. 26 are determined based on the symbol determination tables 360 to 368. Of the symbol determination tables 360 to 368, the symbol determination table 360 is used for the normal mode, and the symbol determination tables 361 to 368 are used for the first to eighth chance mode games.

As in the case of the symbol code determination tables 340 to 348, each of the symbol determination tables 360 to 368 may be divided into five tables respectively corresponding to the symbol arrays. Further, all the tables may also be integrated into a single table having 45 data fields.

The probability of each symbol appearing on the payline affects the probability of a winning combination being formed. To the contrary, the symbol determination tables 360 to 368 may be generated based on the probability of the winning combination. The relation between the winning combinations and their probabilities can be arranged as in the case of the payout tables 380 to 388 shown in FIG. 29. The payout tables 380 to 388 each defines the payouts and the winning combinations. There are separate payout tables 380 to 388 for the normal mode game and the chance mode game. In particular, it is preferable to separately provide the payout tables for use in the eight unit games in the chance mode. Of the payout tables 380 to 389, the payout table 380 may be used for the normal mode game, and the payout tables 381 to 388 may be used for the first to eighth chance mode games, respectively. All the payout tables 380 to 388 may be integrated into a single table.

Every time the unit game is run, there is determined if a winning combination is formed on any payline, in the winning determination process P310 in the game program which is executed by the main CPU 71. When a winning combination defined in the payout tables 380 to 388 is included in one of the paylines, that winning combination is detected and the amount of payout is checked, referring to the payout tables 380 to 388, in the winning determination process P310. The amount of payout determined is paid out in the payout process P314. When no winning combination is formed by the symbols appearing on the paylines, the result is determined as to be so-called "lost".

For example, when three "7" symbols appear on a symbol array, along any one of the paylines LINE1 to LINE5, a winning combination of three "7" symbols is formed and 200 times the bet amount is awarded as the payout. The benefit in the form of payout is awarded to the player by actually paying out coins to the coin tray 92, or by adding credit equivalent to the amount.

(Winning Probability in Chance Mode)

As hereinabove mentioned, when the "Chance Cherry" symbol appears at the second row in the third column of the symbol matrix, the game mode shifts to the chance mode and the chance mode is maintained until the end condition is satisfied. The end condition is formation of a winning combination including the "7" symbol, or appearance of the "Cherry" symbol on one of the paylines in the symbol matrix formed by the rearranged symbols.

When the game mode shifts to the chance mode, a counter is set in the counter process P306 shown in FIG. 21A, which counts the number of unit games already played in the chance mode, or the number of unit games yet to be run in the chance mode. Then, a random number is generated in the random number generating process P302, and the symbols to be stopped are determined using the random number generated and with reference to the symbol code determination tables 341 to 348 in the symbol determination process P304. The symbol determination process P304 uses the symbol code determination table 341 for the first unit game in the chance mode. The symbol code determination tables are successively used with the progress of the chance mode games. When the eighth unit game (in the present embodiment, the last unit game in a session of the chance mode) of the chance mode is reached, and when the symbol combination (e.g., including combinations of symbols to be stopped) does not satisfies the end condition, the process of determining the symbol combination is repeated in the symbol determination process P304, until the symbol combination that satisfies the end condition is obtained.

The probability of a winning combination being formed differs depending on the symbol code determination tables 341 to 348. In particular, as the chance mode continues, the probability of a winning combination including a specific symbol being formed becomes higher. The symbol code determination tables 341 to 348 each have mapping data of the random numbers and symbol codes. The mapping data is such that a combination related to a specific symbol is more frequently formed as the chance mode continues.

The specific symbol in the present embodiment is the "7" symbol. That is, as the chance mode continues, the probability of the "7" symbol appearing in the symbol matrix or in a symbol combination becomes higher. The probability of the "7" symbol, i.e., the specific symbol, may be set higher than that of the normal mode. Further, it is possible to another symbol such as "Cherry" symbol as another specific symbol.

The following description assumes the "7" and "Cherry" both serve as a specific symbol.

FIG. 30 shows a table in which the probability of a winning combination related to the specific symbol is increasing. As shown in the table on the right side of FIG. 30, the probability of a winning combination including three "7" symbols is increased as the chance mode game continues. In other words, the probability of a combination with three "7" symbols being formed in the second unit game is higher than that being formed in the first unit game. Further, that probability in the third unit game is higher than the same in the second unit game. As described, until the last (eighth) unit game is reached, the probability of a winning combination with three "7" being formed is gradually increased. The same goes to a winning combination with four "7" symbols, or with five "7" symbols.

As result, the total of the probability of the winning combination related to the "7" symbol being formed is increased as the chance mode game is repeated. In the example shown in the figure, the probabilities of the combinations with three "7" symbols, with four "7" symbols, and with five "7" symbols are 1/32.8, 1/67.2, and 1/672.0, respectively, in the first chance mode game. As described, the total probability of the combination related to the "7" symbol is 1/21.7(=1/32.8+1/67.2+1/672.0) in the first chance mode game. The total probability is raised to 1/18.7 in the second unit game, and raised to the 1/3.1 in the eighth unit game.

The same goes for the probability of the winning combination related to the "Cherry" symbol. To amuse the player, the total probability of the winning combination related to the "Cherry" symbol is set to zero for the first unit game, and is increased as the unit games are progressed. In particular, the total probability of the winning combination related to the "Cherry" symbol is 1/10.4 in the second unit game, and 1/6.6 in the third unit game. After the successive increase in the probability, the total probability of the winning combination related to the "Cherry" symbol reaches up to 1/1.5 in the eighth unit game.

The total probability of the winning combination related to the "Cherry" symbol and the "7" symbol is 1/21.7 in the first unit game. As described, the probability of the chance mode ending after the first unit game is approximately 4.61% (=1/21.7), and the probability of the chance mode being continued is 95.39% (=1−1/21.7).

The total probability of the winning combination related to the "Cherry" symbol and the "7" symbol is raised to 1/6.7 (=1/10.4+18.7) in the second unit game. Therefore, the probability of the chance mode ending after the second unit game is approximately 14.95% (=95.39%×1/6.7), and the probability of the chance mode being continued is 85.05% (=95.39%×(1−1/6.7)). The total probability of the winning combination related to the "Cherry" symbol and the "7" symbol is raised to 1/4.6(=1/6.6+15.1) in the third unit game. Therefore, the probability of the chance mode ending after the third unit game is approximately 21.73% (=85.05%×1/4.6), and the probability of the chance mode being continued is 78.27% (85.05%×(1−1/4.6)).

The total probability of the winning combination related to the "Cherry" symbol and the "7" symbol is raised to 1/1.0 (=1/1.5+3.1), in the last (eighth) unit game. Therefore, the probability of the chance mode ending after the eighth unit game is 100%. When the eighth unit game is reached, the random number generating process P302 and the symbol determination process P304 are repeated to repetitively generate random numbers and determine the symbols, until the winning combination is formed.

(Operation of Slot Machine)

The following describes an operation of the slot machine 10 with reference to FIG. 31 to FIG. 37.

Note that the following description assumes that one of a plurality of stop tables is randomly determined at the timing of pressing the start button, and the reels M3 are automatically stopped at a predetermined timing based on the stop table determined; however, the slot machine 10 is not limited to this. Specifically, the following structure is possible. Namely, the slot machine 10 has not-shown reel stop buttons corresponding to the reels M3, respectively, and randomly determines one of the stop tables at the timing of pressing the operation button. Based on that stop table determined and the timing of pressing the reel stop buttons, the reels M3 may be stopped. In other words, after the internal random determination of the stop table, the slot machine 10 may stop the reels M3 at the timing of pressing the reel stop buttons and with the stop table randomly determined internally, and then determine if there is a prize for any combination of the symbols 501 stopped on all the reels M3.

Figure 31:
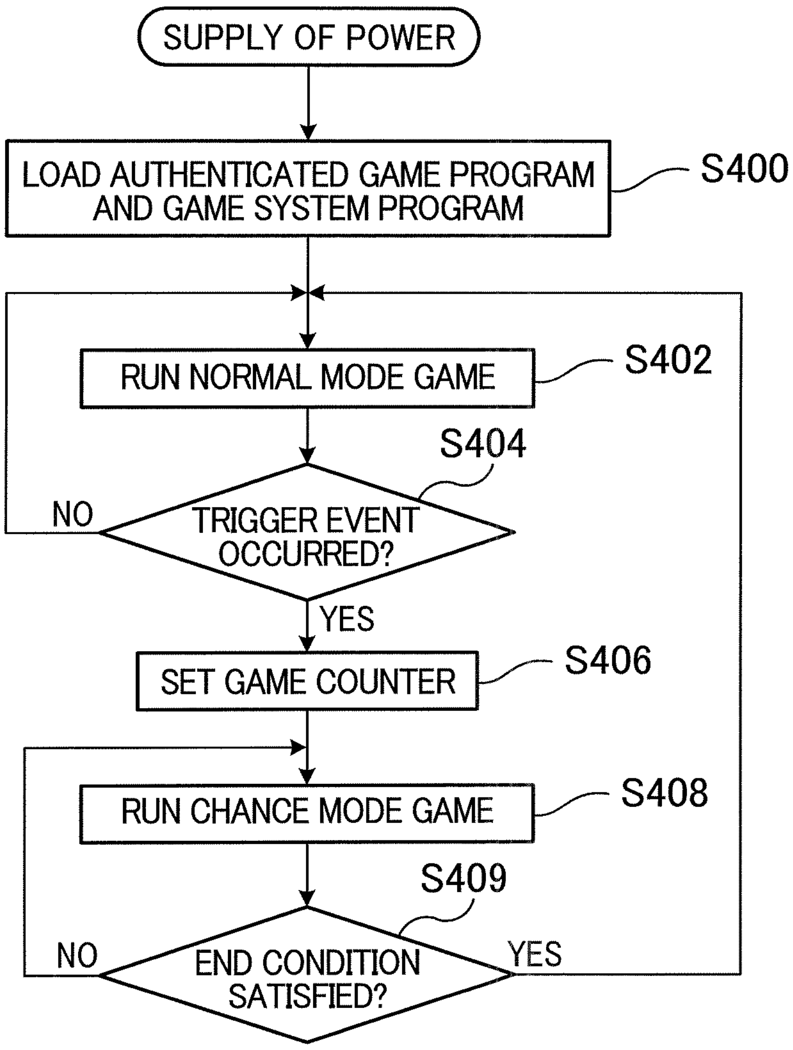
FIG. 31 is a flowchart showing an overall process executed in the gaming machine related to the first embodiment.

FIG. 31 shows a process executed in the slot machine 10. When the power is supplied to the slot machine 10, the main CPU reads out the program from the memory card 54 via the gaming board 50, and writes the program into the RAM 73, thus loading the authenticated game program and the game system program (S400). Next, the main CPU 71 runs the game program and the game system program.

When the unit game is started by an IC card inserted into the IC card reader by the player or entering a coin into a coin receiver, a new unit game is run based on the coin entered or the bet stored. The game mode of the unit game to be run first after the slot machine 10 is booted is the normal mode. As described, the main CPU 71 executes the normal mode game process for the first unit game (S402).

Every time the normal mode game ends, the main CPU 71 in the game mode determination process P316 determines whether a trigger event has occurred (S404). The game mode of the subsequent unit games is maintained in the normal mode, unless a trigger event has occurred. Thus, the main CPU 71 causes the process to return to step S402, and executes the normal mode game process for the subsequent unit games.

However, when the main CPU 71 determines that a trigger event has occurred in step S404 of the determination process, the CPU 71 changes the game mode of the subsequent unit game to the chance mode.

As hereinabove mentioned, in the preferable embodiment, the number of unit games run in a single session of the chance mode is 8. The symbol code determination tables 341 to 348 are different from one another, and are used for unit games of the chance mode, respectively. Every time the unit game of the chance mode is run, the game counter counts up the number of unit games already run in the session, or counts down the number of unit games remaining in the session. The following description assumes that the game counter counts up the number of unit games run, starting from zero. Therefore, the main CPU 71 sets the value of the game counter to zero in step S406. After that, the main CPU 71 executes the game process for the subsequent games in the chance mode (S408).

Every time the unit game in the chance mode ends, whether the end condition is satisfied is determined in game mode determination process P316 (S409). Unless the end condition is satisfied, the game mode of the subsequent unit game is maintained in the chance mode. Therefore, the main CPU 71 causes the process to return to step S408, and executes the chance mode game process for the subsequent unit game.

When the main CPU 71 determines that the end condition is satisfied in the determination process of step S409, the CPU 71 switches the game mode of the subsequent unit game to the normal mode. Then, the main CPU 71 causes the process to return to step S402, and executes the normal mode game process for the subsequent unit game.

Figure 32:
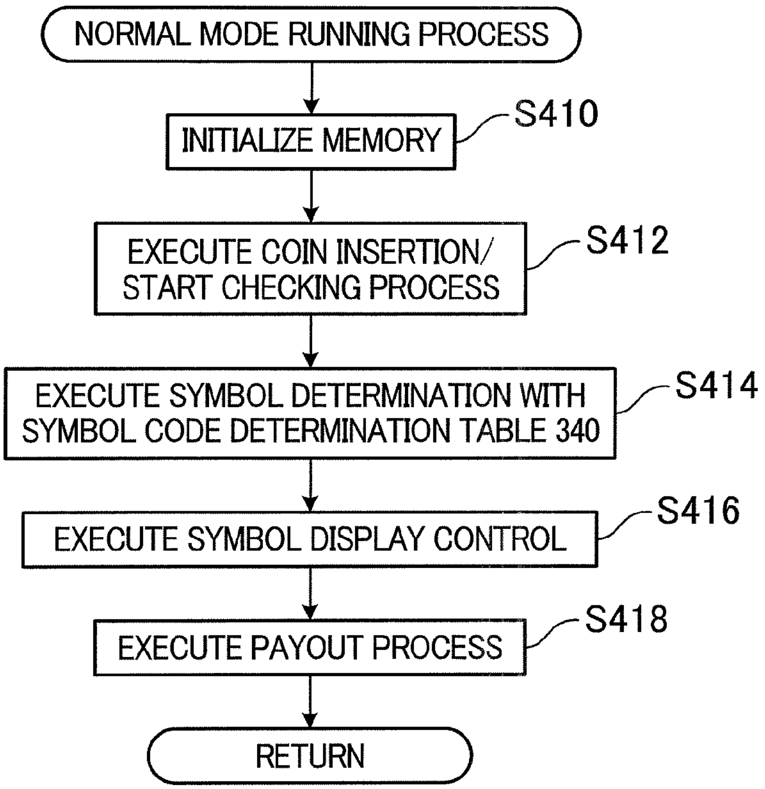
FIG. 32 is a flowchart showing a normal mode game process.

FIG. 32 shows the normal mode running process and shows the details of step S402 shown in FIG. 31.

Every time the unit game ends, the main CPU 71 executes a memory initializing process (S410). In this initializing process, the main CPU 71 clears unnecessary data and information from the temporary work area of the RAM 73. The unnecessary data and information include: payout data, information of winnings or loses, and information of symbols to be stopped which are determined in the previous unit game.

After that, the main CPU 71 executes a coin insertion/start checking process (S412). In this process, the main CPU 71 checks an insertion of a coin or a bill, and scans inputs from the BET button and the START button.

After the START button [spin button] is pressed by the player, the main CPU 71 executes the symbol determination process (S414). In this process, the main CPU 71 generates five random numbers, and determines, with reference to the symbol code determination table 340, five symbol codes of five symbols to be stopped according to the random numbers. The main CPU 71 determines whether the symbol matrix formed by the rearranged symbols includes any winning combination.

In step S416, the main CPU 71 executes the symbol display control process. In this process, the main CPU 71 controls the reel device M1 to rotate the reels M3 of the first to fifth reel units M11*a* to M11*e*, and then stops the reels M3 to form a symbol matrix on the display window 150 by rearranging the symbols according to the result of the symbol determination process.

Next, the main CPU 71 in step S418 executes the payout process to determine the amount of payout, and award the amount of payout determined to the player.

(Symbol Determination Process)

Figure 33:
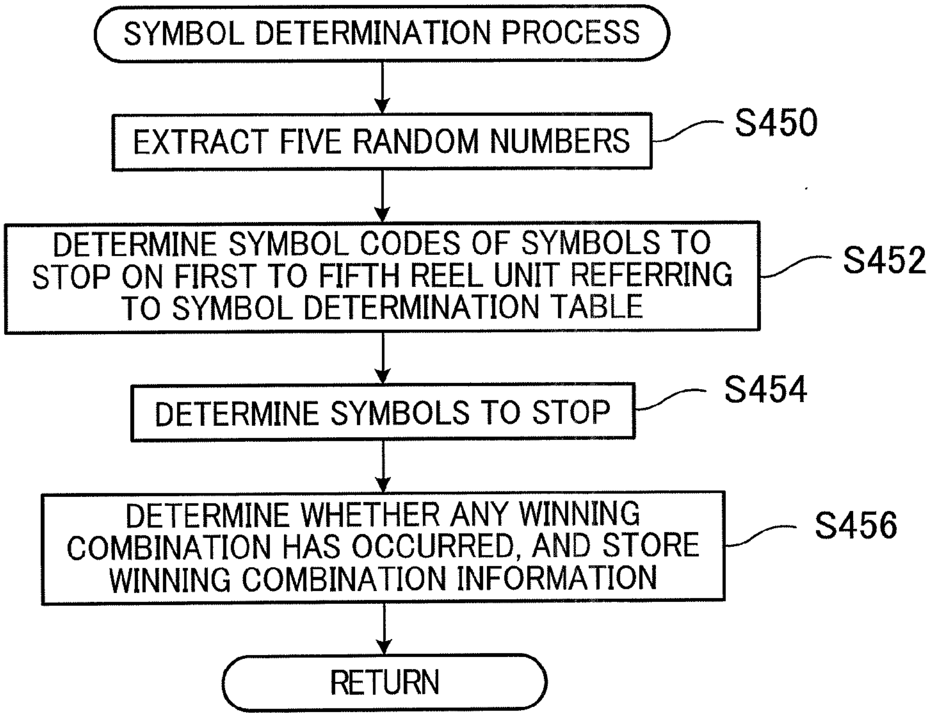
FIG. 33 is a flowchart showing details of the symbol determination process.

FIG. 33 shows the symbol determination process and shows the details of step S414 shown in FIG. 32.

First, in the random number generating process P302 executed by the main CPU 71, five random numbers are sampled (S450).

After that, in the symbol determination process P304 executed by the main CPU 71, the first to fifth symbol codes are determined by using the first to fifth random numbers, with reference to the symbol code determination table 340 (S452). Next, the main CPU 71 refers to the symbol code table and uses the first to fifth symbol codes to determine the first to fifth symbols to be stopped as shown in FIG. 22 (S454). Thus, the five symbols to be stopped are determined by using the five random numbers. After the first to fifth symbols to be stopped are determined, the main CPU 71 stores the symbols or the symbol codes in the RAM 73.

The five symbols to be stopped are the symbols to be stopped in the second row of the symbol matrix shown in FIG. 24. The alignment of the symbols structuring the first to fifth symbol arrays are fixed on the reels M3 of the first to fifth reel units M11*a* to M11*e*. Therefore, determining these symbols to be stopped will determine all the symbols structuring the symbol matrix. The main CPU 71 refers to the symbol code table of FIG. 22, and determines all the symbols structuring the symbol matrix based on the symbols to be stopped (S456).

After that, in the winning determination process P310 executed by the main CPU 71, there is determined whether a winning combination is formed by the symbols determined in step S456, which structure the symbol matrix (S458). When a winning combination is formed by the symbols structuring the symbol matrix, the winning combination is stored in the RAM 73, in the winning determination process P310. Further, the main CPU 71 may determine whether a winning combination is formed based on the symbol codes of the symbols to be stopped, instead of using the symbol matrix for determining whether a winning combination is formed.

When the symbol determination process ends, the flow returns to the main process (not shown). Then, the symbol display control process is executed, and the reels M3 of the first to fifth reel units M11*a* to M11*e* are rotated. The reels M3 of the first to fifth reel units M11*a* to M11*e* rotate at different speed from one another, and the symbol arrays on the reels M3 of the reel device M1 scroll on the display window 150. While the reels M3 are rotating, the backlight unit M7 is activated to provide an effect from the back of the reel band M32. After this, the reels M3 of the first to fifth reel units M11*a* to M11*e* are stopped. Through this, scrolling of the symbol arrays are stopped so that the symbols to be stopped are positioned in the second row of the symbol matrix formed on the display window 150.

When the symbol display control process ends, the process returns to the main process. Then, the payout process is executed. When a winning combination is formed, the amount of payout is determined according to the winning combination, and the amount determined is paid out in the form of increasing the credit or outputting of the coins.

(Chance Mode Running Process)

Figure 34:
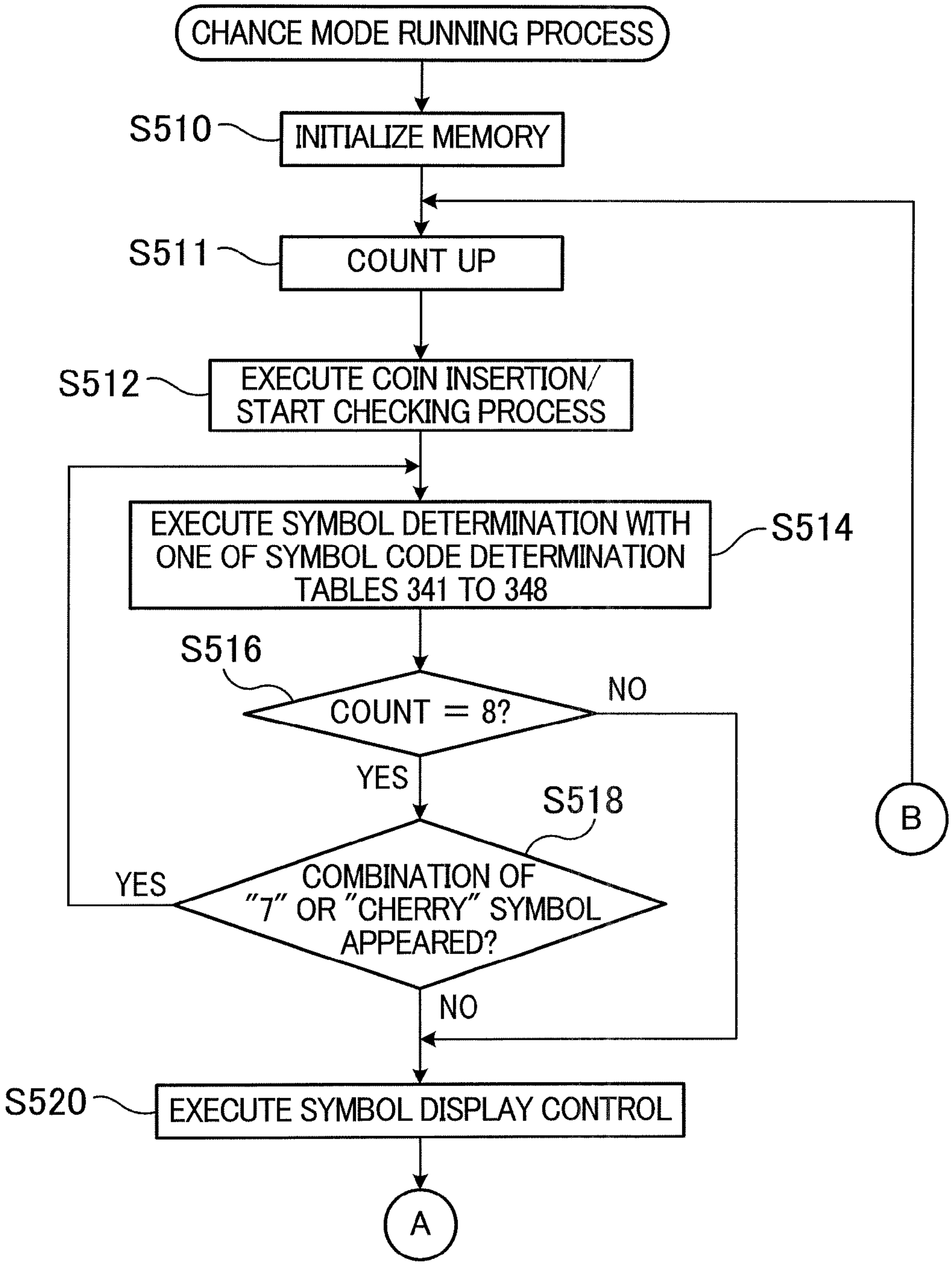
FIG. 34 is a flowchart showing a process of a chance mode game.
Figure 35:
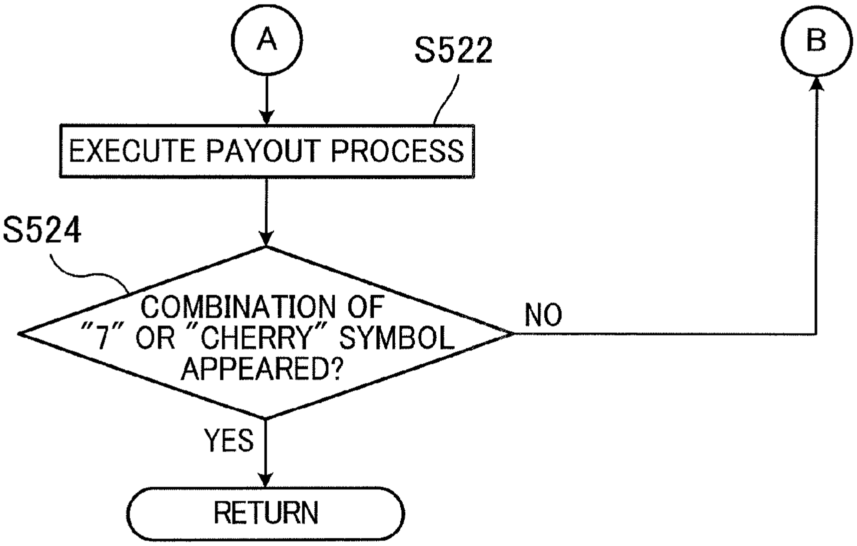
FIG. 35 is a flowchart showing a process of a chance mode game.

FIG. 34 and FIG. 35 shows in detail the end condition determine process (S409) and the chance mode game process (S408) shown in FIG. 31.

When shifting to chance mode occurs, the main CPU 71 first executes the memory initializing process (S510). the main CPU 71 clears unnecessary data and information from the temporary work area of the RAM 73. The unnecessary data and information include: payout data, information of winnings or loses, and information of symbols to be stopped which are determined in the previous unit game.

Next, the main CPU 71 increments the counted number of the game counter indicating a serial number of the chance mode game run in step S511. Since the counted number of the game counter is initialized to 0, the counted number of the game counter is set to 1 for the first chance mode game.

Then, the main CPU 71 executes the coin insertion/start checking process (S512). In this process, the main CPU 71 checks for insertion of the coin or the bill, and detects an input signal from the BET button and the START button.

After the START button is pressed by the player, the main CPU 71 executes the symbol determination process (S514). In this process, the main CPU 71 generates five random numbers. Next in the symbol determination process P304 executed by the main CPU 71, the first to fifth random numbers are used to determine the first to fifth symbol codes, with reference to one of the symbol code determination tables 341 to 348. When the first chance mode game is run, the symbol code determination table 341 is used for determining the symbol codes. When the second chance mode game is run, the symbol code determination table 342 is used for determining the symbol codes. Similarly, when the other chance mode games are running, one of the symbol code determination tables 343 to 348 is successively used to determine the symbol codes.

After that, the main CPU 71 refers to the symbol code table shown in FIG. 22, and determines the first to fifth symbols to be stopped, which correspond go the first to fifth symbol codes, respectively. As the result, the five symbols to be stopped are determined by using the five random numbers.

After the first to fifth symbols to be stopped are determined, the main CPU 71 stores the symbols or the symbol codes in the RAM 73.

Next, in the winning determination process P310 executed in the main CPU 71, there is determined whether a predetermined winning combination is formed by the rearranged symbols. If the predetermined winning combination is formed by the rearranged symbols, that winning combination is stored in the RAM 73, in the winning determination process P310.

The main CPU 71 checks if the value of the game count 324 has reached 8 (S516). The value of the game count 324 indicates that the last (eighth) chance mode game is running. When the game counted number has reached 8, the main CPU 71 determines whether the end condition is satisfied (S518). One end condition is formation of a winning combination including the "7" symbol. Another end condition is appearance of the "Cherry" symbol on a payline of the symbol matrix formed by the rearranged symbols.

When the value of the game count 324 reaches 8 and when there is no winning combination including the "7" symbol, or when no "Cherry" symbol appears on the payline of the symbol matrix formed by the rearranged symbols, the main CPU 71 causes the process to return to step S514, and repeats step S514. Through step S518, it is possible to cause the winning combination including the "7" symbol to appear, or cause the "Cherry" symbol to appear on the payline of the symbol matrix formed by the rearranged symbols.

On the other hand, in step S516, when the value of the game count 324 has not reached 8, when a winning combination including the "7" symbol is not formed in step S518, or when no "Cherry" symbol appears on the payline of the symbol matrix formed by the rearranged symbols, the process moves to step S520.

The main CPU 71 controls the reel device M1, and executes the symbol display control process to stop the rotation of the reels M3 of the first to fifth reel units M11*a* to M11*e* (S520). The scrolling of the symbols is stopped according to the result of the symbol determination process, and the symbols are rearranged to form the symbol matrix on the display window 150. The main CPU 71 executes the payout process to determine the amount of payout, and provides the amount of payout determined to the player (S522).

The main CPU 71 again determines whether the end condition is satisfied (S524). When the end condition is satisfied, the main CPU 71 ends the chance mode gaming process. In step S524, if the end condition is not satisfied, the process returns to step S511, the value of the game count 324 is increased, and the chance mode is maintained to run the unit game in the chance mode.

As hereinabove mentioned, the chance mode game continues, until a winning combination including the "7" symbol or the "Cherry" symbol appears on at least one of the paylines LINE1 to LINE5. It is possible to adopt a structure such that the main CPU 71 satisfies the end condition without fail, when the chance mode game is run a predetermined maximum number of times.

In a preferable embodiment, the probability of a winning combination including the "7" symbol appearing in the chance mode is higher than that in the normal mode. Specifically, as the chance mode continues, the probability of the winning combination including the "7" symbol appearing is gradually raised. This probability becomes 100% in the eighth chance mode game. The probabilities of other winning combinations may be lowered to some extent than the probabilities in the normal mode. The paylines LINE1 to LINE5 are preferably activated irrespective of the bet amount.

As hereinabove describe, when the chance mode game is running, the visible light 901 is applied to the area other than the range for displaying the game result including the symbols 501 so as to display, by means of reflection of the visible light 901, visual information 902 reading "CHANCE ZONE" in the area other than the range for displaying the game result, as shown in FIG. 17 and FIG. 18. This reports that the game mode is in the chance mode.

Note that it is possible to report that the game mode is in the chance mode by means of visual and/or audio effect. Further, the chance mode may be reported by: making the backlight of the backlight unit M7 brighter or darker than the normal mode; outputting a higher sound when the start button is operated; or making the pitch of the reel stop sound shorter.

(Light Application Control Process)

Figure 36:
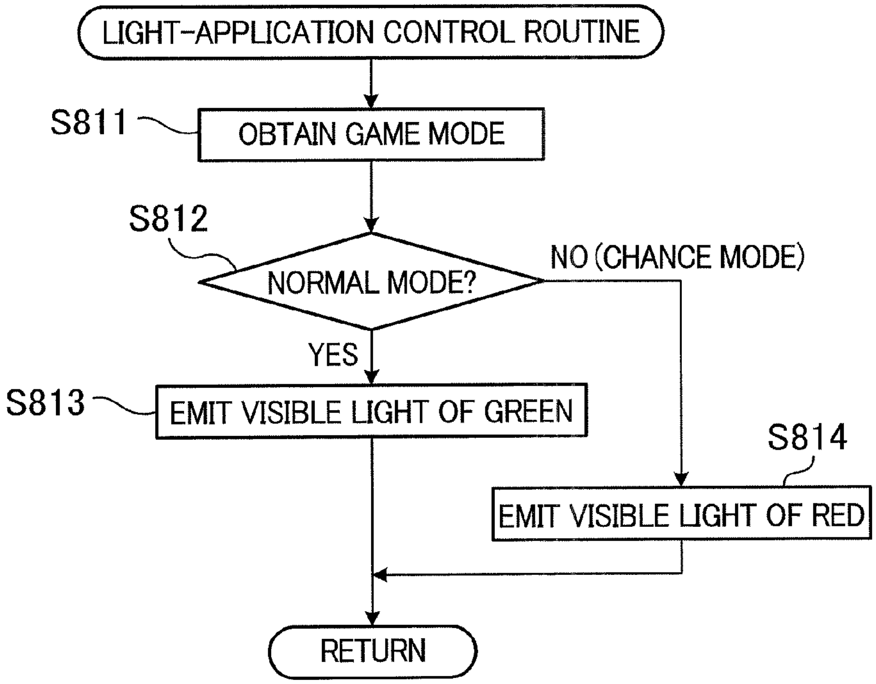
FIG. 36 is a flowchart of a light-application control routine.

With reference to the light-application control routine of FIG. 36, the following describes the light application control process which notifies of the type of the game mode. First, the type of the current game mode is obtained (S811). Next, whether the game mode is in the normal mode is determined (S812). When the game mode is in the normal mode (S812: YES), the green visible light 901 indicating the normal mode is emitted (S813), and the present routine is ended. Since the visible light 901 of green is a complementary color to red which is the color of the transparent panel R11, the visible light 901 having passed the transparent panel R11 is applied to the reels M3 while hiding the visual information 902 ("CHANCE ZONE") on the transparent panel R11, as shown in FIG. 17. That is, the player is unable to see the visual information 902("CHANCE ZONE") on the reels M3 through the display window 150.

On the other hand, when the game mode is not in the normal mode (S812: NO), red visible light 901 indicating the chance mode is emitted (S814), and the present routine is ended. Since the color of the visible light 901 is red which is the same as the color of the transparent panel R11, the visible light 901 having passed the transparent panel R11 is applied to the reels M3 while making the visual information 902 ("CHANCE ZONE") on the transparent panel R11 visible, as shown in FIG. 18. In other words, the player is able to see the visual information 902 ("CHANCE ZONE") on the reels M3 through the display window 150. This routine executing the above described processes are repetitively executed.

Thus, every time the game mode is switched between the normal mode and the chance mode, the green visible light 901 and the red visible light 901 are switched to one another. To the reels M3, visible light 901 of the either color is always applied. This enables the player to confirm whether the current game mode is in the normal mode or in the chance mode, by the color of the visible light 901 applied to the reels M3. Further, the player is able to confirm the chance mode by looking at the visual information 902 ("CHANCE ZONE").

Note that, in the present embodiment, the normal mode is associated with the green visible light 901, and the chance mode is associated with the red visible light 901; however, the associated color of visible light 901 is not limited to these, as long as the color of the visible light 901 is made different between different modes.

Figure 37:
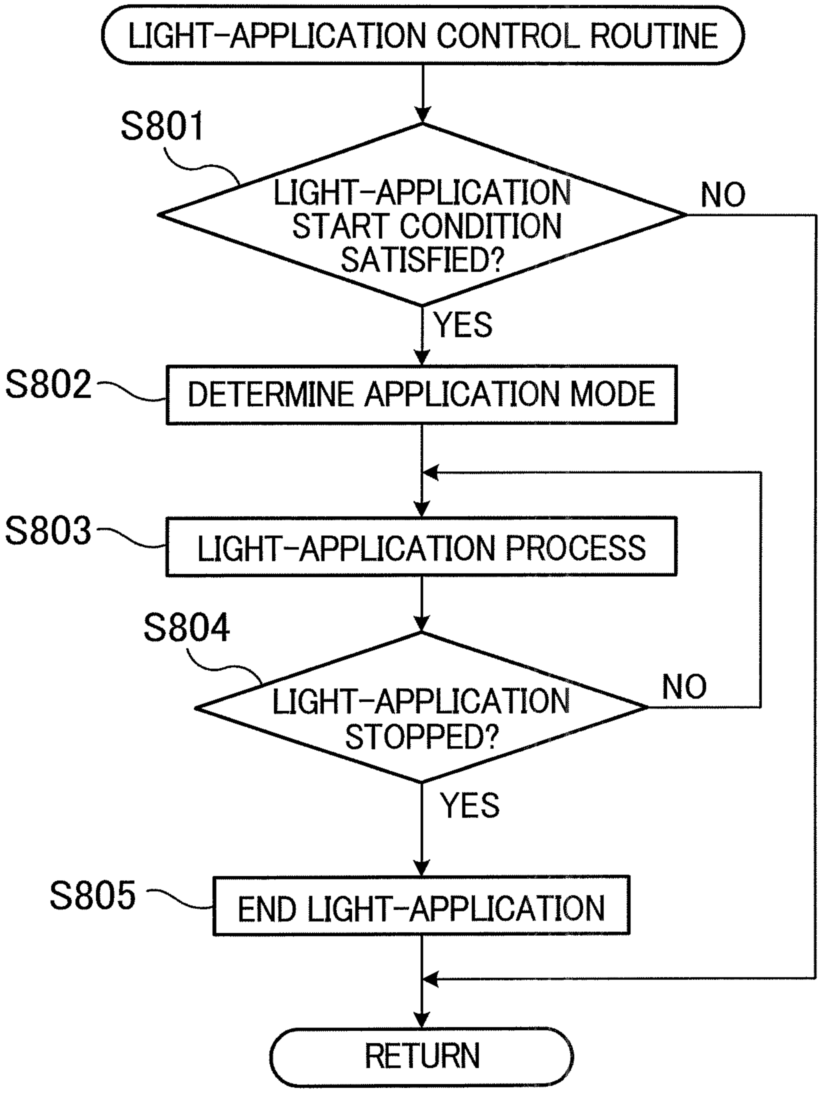
FIG. 37 is a flowchart of the light-application control routine.
Figure 38:
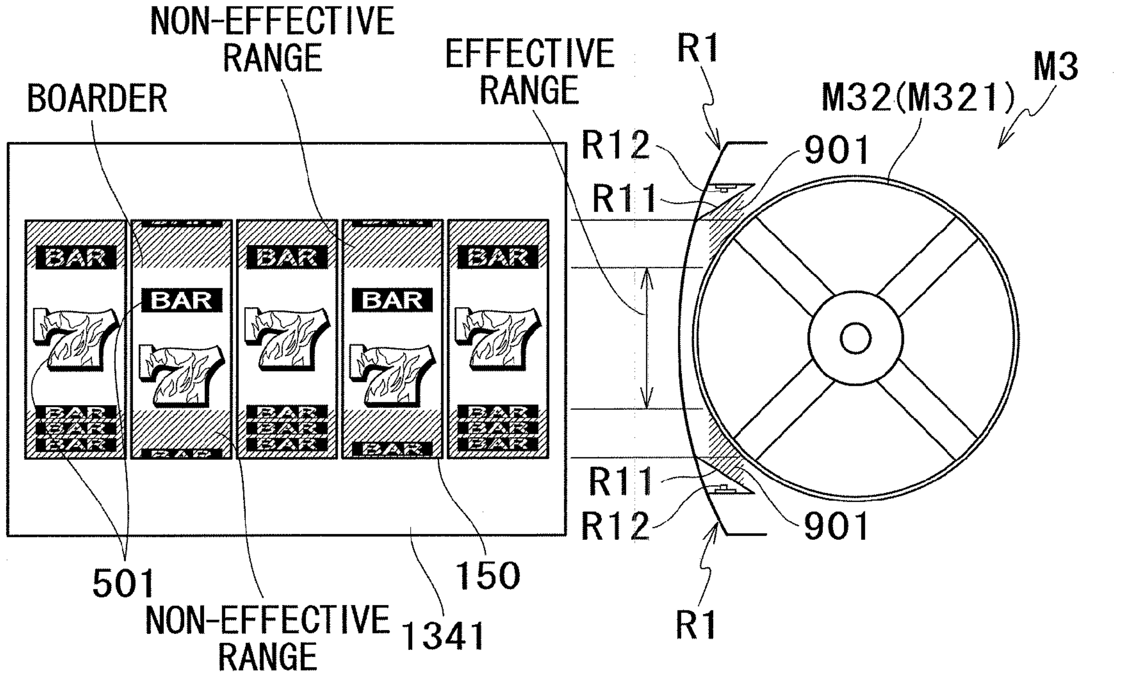
FIG. 38 is an explanatory diagram showing a relation between active areas and non-active areas.

Further, the light application control process may be executed in the light-application control routine of FIG. 37. That is, first, there is determined whether the light application starting condition is satisfied (S801). When the light application starting condition is not satisfied, i.e., when the game mode is not in the chance mode (S801: NO), the present routine is ended. When the present routine is resumed at a predetermined timing, the process of determination in S801 is repeated.

This way, the period in which the light application starting condition is not satisfied (non-chance mode period), the free game and the basic game are run without emitting the visible light 901, the symbols 501 are displayed in columns throughout the entire display window 150. Note that the light application starting condition may also be winning of a predetermined prize, starting of a predetermined type of game, or the like, in addition to the period of the chance mode.

Figure 19:
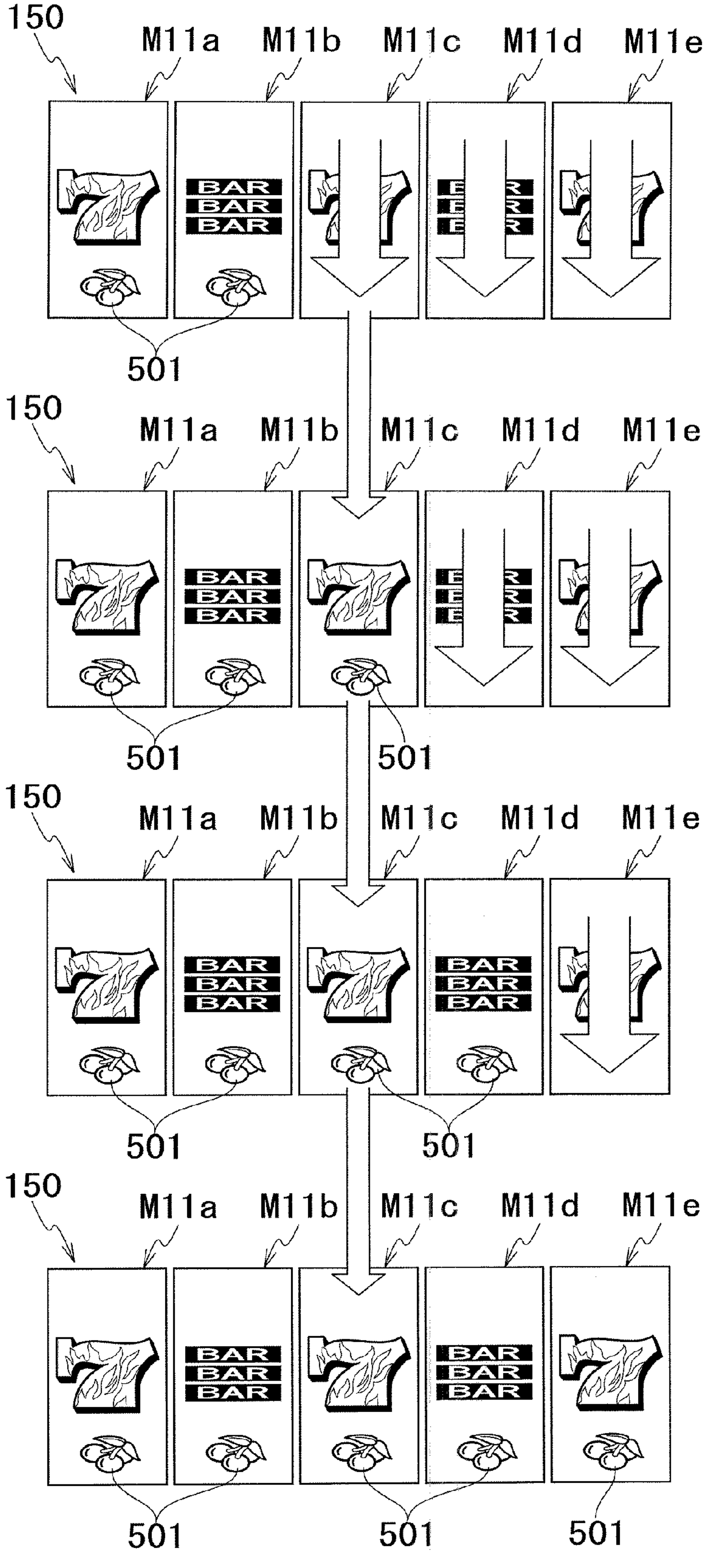
FIG. 19 is an explanatory diagram showing a process of displaying symbols with a use of visible light.

When the light application starting condition is satisfied, i.e., when the game mode is in the chance mode (S801: YES), the mode of light application is determined (S802). Specifically, examples of the mode of light application includes: a visual information display mode and a symbol display mode. FIG. 17 shows a state where the visible light 901 of the complementary color is applied so that the visual information of "CHANCE ZONE" is not shown on the surface of the reels. In FIG. 17, the "CHANCE ZONE" is shown in dotted lines; however, since the text is in the color of red and the color of the light applied is the complementary color, i.e., green, the text is substantially invisible on the reels. Further, as shown in FIG. 18, the visual information display mode is a mode in which the visible light 901 of a color other than the complementary color is emitted to display the visual information on the reels. The symbol display mode is a mode in which other symbols 501 such as Cherry or the like in an area of a blank symbol, as shown in FIG. 19 and FIG. 20.

After this, the visible light 901 is emitted in the light application mode determine (S803). This way, the player is able to recognize that the current game is in the4 chance mode, by visually confirming the visible light 901 or the visual information 902 reflected on the reels M3. After this, whether to stop the light application is determined (S804: NO). If the light application is not stopped (S804: NO), the light application in S803 is continued. When the light application is to be stopped (S804: YES), the light application process is ended (S805), and the present routine is ended.

Here, the light application start timing and the light application stop timing may be individually set for the rotation and stopping of each reel M3, or may be set at the rotation and stopping all the reels M3. Further, the visible light 901 may be applied only when the reel M3 of the third reel unit M11*c* is stopped. For example, assuming that, in the symbol display mode, the light application start timing and the light application stop timing are individually set at the rotation and stopping of each reel M3, it is possible to display the symbol 501 such as Cherry in the area of the blank symbol, every time the reel M3 is stopped, as shown in FIG. 19. At this time, by alternately outputting the visual information 902 in the complementary color and the visual information 902 in a color other than the complementary color, it is possible to switch back and force displaying and hiding of the text such as "CHANCE ZONE" and the symbol 501. In this case, the displaying of the display window 150 is changed even if the reels M3 are partially rotating.

Figure 20:
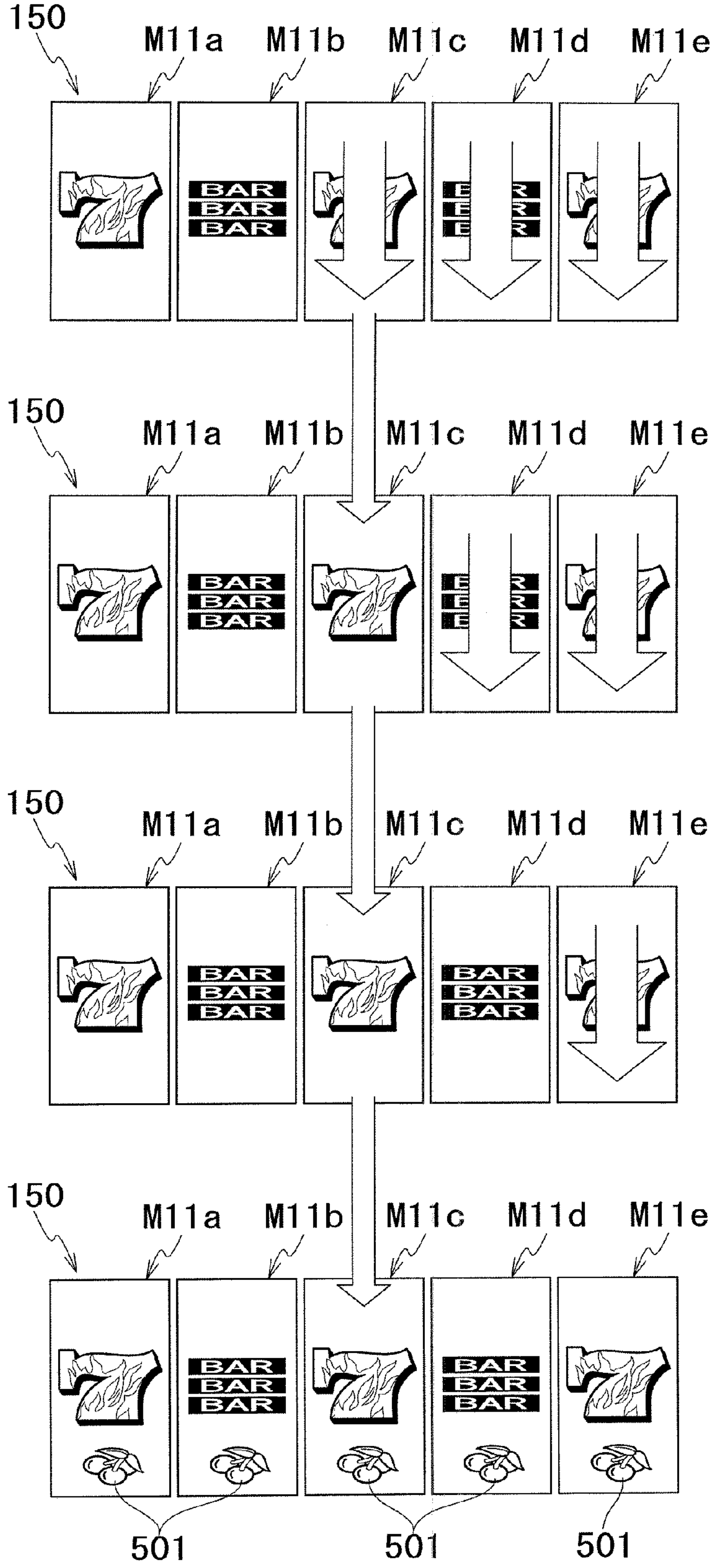
FIG. 20 is an explanatory diagram showing a process of displaying symbols with a use of visible light.

Further, for example, assuming that, in the symbol display mode, the light application start timing and the light application stop timing are set at the rotation and stopping of all the reels M3, it is possible to display the text such as "CHANCE ZONE" and the symbol 501 such as Cherry in the area of the blank symbol, after all the reels M3 are stopped, as shown in FIG. 20. In this case, the display on the display window 150 is changed after all the reels M3 are stopped. At this time, by alternately outputting the visual information 902 in the complementary color and the visual information 902 in a color other than the complementary color, it is possible to switch back and force displaying and hiding of the text such as "CHANCE ZONE" and the symbol 501.

The reason for changing the display on the display window 150 after all the reels M3 are stopped as is described above is that the symbols 501 are hard to see if the display on the display window 150 other than the symbols 501 are changed while the reels M3 are rotating.

Note that FIG. 20 shows an example where the change in the visible light 901 such that the visual information 902 in the complementary color and visual information 902 in a color other than the complementary color are alternately output; however, the present invention is not limited to this. Namely, the slot machine 10 may be structured so that the visible light 901 applied to the reels M3 is changed only when all the reels M3 are stopped. Here, how the visible light 901 is changed maybe as follows, in addition to changing the visible light 901 into the complementary color or into a color other than the complementary color. Namely, the visible light 901 may be changed into a plurality of colors such as blue and red. Further, it is possible to form the visible light 901 by mixing a plurality of colors, and change the visible light 901 by changing the mixing state of the colors. Further, it is possible to change the visible light 901 by switching the brightness and the light intensity of the visible light 901. Further, it is possible to adopt a combination of all the above.

The slot machine 10 of the present embodiment may be operated by the following control method. The control method is specifically a control method of a slot machine 10 including: reels M3 each having a mirror layer (including the half mirror layer M321 of FIG. 15) capable of reflecting light, and a reel band M32 having symbols 501; a reel device M1 rotatably supporting one or more reels M3; a light application device R1 configured to apply, to the outer circumference of the reels M3, visible light 901 representing visual information 902 by which information related to games is obtained; and an illumination light control means (illumination light control unit 642 of FIG. 3), the method including: detecting the presence/absence of rotation of the reels M3 by the illumination light control means; and changing the visible light 901 to be applied to the reel band M32, while rotation of all the reels M3 is stopped. This way, the visibility of the symbols 501 on the reel band M32 is less likely disturbed, and the player is easily able to see the symbols 501 on the reel band M32, even when the reels M3 are rotating.

In other words, the slot machine 10 includes the illumination light control means having means for detecting the presence/absence of the rotation of the reels M3 (illumination light control unit 6421 of FIG. 3), means for changing the visible light 901 to be applied to the reel band M32, while the rotation of all the reels M3 is stopped (illumination light control unit 6422 of FIG. 3). The slot machine 10 may be configured to be operated by a control method in which the visible light 901 to be applied to the reels M3 is changed only when all the reels M3 are stopped.

In cases where the visible light 901 to be applied to the reels M3 is changed only when all the reels M3 are stopped, it is possible to have the slot machine 10 execute the following process which is unique to the mechanical reels. Specifically, by setting the timing of applying the visible light 901 at the chance mode by the cherry chance, it is possible to display the change in the visible light 901 on the reels M3, the change indicating the cherry chance mode in which a payout table different from that of the normal game is used. This way, it is possible to inform the player that the game is in the cherry chance mode.

In cases of the mechanical reels (reel device M1), mechanically changing the reels M3 is difficult. Although there are payouts in the normal games, there is switching over to a payout table having no payout, during the game in the chance mode of the cherry chance. Informing this to the player is very important. Enabling this by means of changing the visible light 901 in the cherry chance mode allows the player to sufficiently understand that the game is currently run based on a payout table having no payout.

Here, the game in the chance mode of the cherry chance is a mode in which there is no change in the hardware such as the reel device M1, and by changing the information processing (data table or the like), the operation is made different from the normal game in terms of software.

Further, the slot machine 10 may adopt a control method such that the color of the backlight from the backlight unit M7 is changed to change the display state of the symbols themselves. In this case, even with the same physical reels are used to change the winning combination or the payout, combining the visible light 901 from the light application device R1 with the backlight from the backlight unit M7 makes it possible to clearly notify the player that the gaming mode is changed, as if the reel bands M32 of video reels have been modified.

The foregoing embodiment deals with a structure such that the text reading "CHANCE zone" is shown as the visual information 902 on the reel surfaces. However, the light application device R1 may be also used for clearly indicating the border between an active range in which a symbol combination yields a prize and a non-active range in which a symbol combination yields no prize. In this case, area displaying for indicating the non-active range (application of light having passed through a transparent member to this area) corresponds to the visual information 902 of the present invention.

Specifically, the light application device R1 is set so as to apply the visible light 901 to an area on the side of the non-active range from the border between the active range and the non-active range of the symbols 501. In other words, the visible light 901 rendering the visual information 902 is applied to the area on the side of the non-active range which is an area other than the active range of the symbols 501. This way, the light application device R1 clarifies the active range and the non-active range by the presence/absence of the reflection of the visual information 902 by the visible light 901. As the result, the border between the active range and the non-active range is easily modified. This, for example, enables application of the visible light 901 corresponding a game mode in which the active range is modified during the unit game or after every unit game.

Further, when the chance mode game is run, the active range is emphasized by applying the visible light 901 to the non-active range which is a range other than the active range displaying the game result including the symbols 501.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

(Modifications)

The following describes a modification of the present embodiment.

(Modification: Light Source, or the Like)

It is possible to adopt, in place of the light application device R1, for example, a liquid crystal display device, an LED (Light Emitting Diode) illumination, an ultraviolet illumination, an infrared illumination, a light bulb, a lighting board, a cold cathode tube, a projector, a laser beam emitting device, an electro luminescent display device, an electronic paper, a holography device, a Flashing Light, a halogen light source, a dot matrix, a segment display device, a fluorescent character display tube (VED: Vacuum Fluorescent Display), a DLP (Digital Light Processing), or the like. Further, although the illumination light device R1 applies the visible light to the half mirror layer M321, the illumination light device R1 may only glow. Further, the light may be projected on the surface of the reel bands M32, instead of reflecting the same. The following describes overviews of the fluorescent character display tube, DLP, and electronic paper.

(Modification: Light Source, or the Like: Fluorescent Character Display Tube)

The fluorescent character display tube is a display device having a cathode, an anode, and a grid sealed in a glass tube in the vacuum state. Use of the fluorescent character display tube realizes a bright and clear display. It is possible to use this to display the visual information 902.

(Modification: Light Source, or the Like: DLP)

The DLP is a projector which condenses light from a white lamp, applies the light to a digital mirror device, enlarges the light when the individual mirrors of the digital mirror device are in the on-state, and project the light to a screen. Projecting the light on the surface of the reels M3 or the like enables the player to visually confirm the visual information 902. Note that projectors other than the DLP are also adoptable.

(Modification: Light Source, or the Like: Electronic Paper)

An electronic paper is a device (paper) that allows electrically rewriting displayed contents. The electronic paper may be one that involves micro capsules, Quick-Response Liquid Powder, liquid crystal, electrowetting, electrophoretic migration, chemical reaction, or the like. It is possible to use this electronic paper to enable the player to visually confirm the visual information 902.

(Modification: Light Source, or the Like)

Examples of the visual information 902 include: a three-dimensional image, an image formed by a plurality of images, a two-dimensional video, or a three-dimensional video, in addition to a two-dimensional image. Further, it is possible to adopt a three-dimensional structure (figures, or the like).

(Modification: Reflector or the Like)

Further, in place of the half mirror layer M321, it is possible to adopt in combination with the half mirror layer 321, a resin sheet, a resin panel, an iron plate, aluminum, paper, fabric, fibers, a hologram sheet, a screen film, a mirror film (plate), a half mirror film (plate), or the like to reflect, project, or transmit the visual information 902. The following describes the overview of the hologram sheet.

(Modification: Reflector or the Like: Hologram Sheet)

The hologram sheet is a sheet having on its surface encoded three-dimensional information recorded. When reproduction light is applied to the sheet, a three-dimensional image or the like is displayed. For example, such a hologram sheet may be pasted on a part of the surface of the reels M3.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine, comprising:

a cabinet having a display window;

one or more reels disposed in the cabinet so that each of the reels is visible from outside the cabinet through the display window, with each of the reels having a reel band with symbols; and a light application device configured to apply to the reel band first visible light representing visual information which enables recognition of information related to games, wherein each of the reels has a mirror layer which reflects the visible light from the light application device, and wherein the light application device is disposed in an area outside a window frame of the display window and is oriented so that the first visible light is applied to the reels, on a reel-band side thereof, and the light application device is further configured and arranged to function as a front-light device by emitting second visible light, which second visible light is light other than the visible light that represents the visual information, and wherein the light application device includes a 1) transparent member that is colored and arranged such that a predetermined color is imparted to the visual information by the first, visible light passing through the transparent member, and 2) a light source configured to emit the first, visible light.

2. The gaming machine according to claim 1, wherein the light source is configured to emit, in a switchable manner, visible light of a complementary color to the color of the transparent member and visible light of a color other than the complementary color.

3. The gaming machine according to claim 2, further comprising a reel device configured to support the reels so as to enable the reels to rotate independently of one another; and an illumination light control device configured to control the light application device so that the visible light of the complementary color and the visible light of a color other than the complementary color are switched from one to the other only when rotation of all the reels is stopped.

4. The gaming machine according to claim 3, further comprising a light changer configured to change the first visible light applied to the reel band when the rotation of all of reels is stopped.

5. The gaming machine according to 1, further comprising a transparent liquid crystal panel provided in front of each of the reels.

6. The gaming machine according to 2, further comprising a transparent liquid crystal panel provided in front of each of the reels.

7. The gaming machine according to claim 3, wherein the reel device includes 1) a reel unit configured to rearrange the symbols by rotationally driving the reels; and 2) a reel-unit-holding mechanism configured to detachably hold the reel unit.

8. The gaming machine according to claim 1, further comprising a backlight unit located on an inner-circumference side of each of the reels, and a screen layer which is formed on a front-surface side of the mirror layer on each of the reels, whereby the symbols are visible to a player only when the backlight unit is turned on.

9. The gaming machine according to claim 2, further comprising a backlight unit located on an inner-circumference side of each of the reels, and a screen layer which is formed on a front-surface side of the mirror layer on each of the reels, whereby the symbols are visible to a player only when the backlight unit is turned on.

10. The gaming machine according to claim 1, wherein the light source includes a plurality of full-color LEDs.

11. The gaming machine according to claim 2, wherein the light source includes a plurality of full-color LEDs.

12. The gaming machine according to claim 1, wherein the symbols include a blank symbol.

13. The gaming machine according to claim 2, wherein the symbols include a blank symbol.

14. The gaming machine according to claim 1, further comprising a backlight unit located on an inner-circumference side of each of the reels, wherein the color of light emitted by the backlight unit is changeable to change a display state of the symbols.

15. The gaming machine according to claim 2, further comprising a backlight unit located on an inner-circumference side of each of the reels, wherein the color of light emitted by the backlight unit is changeable to change a display state of the symbols.

* * * * *